US010985691B1

(12) United States Patent
Meller et al.

(10) Patent No.: US 10,985,691 B1
(45) Date of Patent: *Apr. 20, 2021

(54) WATERLESS CLEANING SYSTEM AND METHOD FOR SOLAR TRACKERS USING AN AUTONOMOUS ROBOT

(71) Applicant: EVERMORE UNITED S.A., Road Town (VG)

(72) Inventors: Moshe Meller, Tel Aviv (IL); Eran Meller, Tel Aviv (IL)

(73) Assignee: EVERMORE UNITED S.A., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,238

(22) Filed: Oct. 2, 2020

Related U.S. Application Data

(63) Continuation of application No. 16/523,564, filed on Jul. 26, 2019, now Pat. No. 10,797,636, which is a
(Continued)

(51) Int. Cl.
*H02S 40/10* (2014.01)
*G01S 3/786* (2006.01)
(Continued)

(52) U.S. Cl.
CPC .............. *H02S 40/10* (2014.12); *B08B 1/005* (2013.01); *B08B 1/04* (2013.01); *G01S 3/7861* (2013.01);
(Continued)

(58) Field of Classification Search
CPC .......... H02S 40/10; H02S 20/32; H02S 40/36; H02S 40/38; G05D 1/0225; G05D 1/027;
(Continued)

(56) References Cited

U.S. PATENT DOCUMENTS

| 7,620,476 B2 | 11/2009 | Morse et al. |
| 8,500,918 B1 | 8/2013 | Meller et al. |

(Continued)

FOREIGN PATENT DOCUMENTS

| CN | 106208276 A | 12/2016 |
| EP | 2366964 A1 | 9/2011 |

(Continued)

OTHER PUBLICATIONS

Office Action dated Nov. 16, 2020, for Chilean Application No. 2019-002097 (15 Pages).

(Continued)

*Primary Examiner* — David Redding
(74) *Attorney, Agent, or Firm* — Brown Rudnick LLP

(57) ABSTRACT

A solar tracker waterless cleaning system for cleaning solar panels of a solar tracker being able to be positioned at a pre-determined angle, including a docking station and an autonomous robotic cleaner (ARC), the docking station coupled with an edge of the solar tracker, the ARC including at least one rechargeable power source, at least one cleaning cylinder and a controller, the cleaning cylinder including a plurality of fins which rotates for generating a directional air flow for pushing dirt off of the surface of the solar tracker without water, the controller including a motion sensor for determining an angle of the solar tracker and a heading of the ARC, the docking station including at least one electrical connector for recharging the rechargeable power source, the controller for controlling a cleaning process of the ARC and for transmitting and receiving signals to and from the ARC.

28 Claims, 11 Drawing Sheets

Related U.S. Application Data continuation of application No. PCT/US2018/015221, filed on Jan. 25, 2018, which is a continuation-in-part of application No. 15/826,976, filed on Nov. 30, 2017, now Pat. No. 10,498,288, which is a continuation-in-part of application No. 15/727,055, filed on Oct. 6, 2017, now Pat. No. 10,498,287, which is a continuation-in-part of application No. 15/475,968, filed on Mar. 31, 2017, now abandoned.

(60) Provisional application No. 62/470,342, filed on Mar. 13, 2017, provisional application No. 62/450,584, filed on Jan. 26, 2017.

(51) Int. Cl.
| | | |
|---|---|---|
| *H02S 20/32* | (2014.01) | |
| *H02S 40/38* | (2014.01) | |
| *G05D 1/02* | (2020.01) | |
| *B08B 1/04* | (2006.01) | |
| *G01W 1/02* | (2006.01) | |
| *H02S 40/36* | (2014.01) | |
| *B08B 1/00* | (2006.01) | |

(52) U.S. Cl.
CPC .............. *G01W 1/02* (2013.01); *G05D 1/027* (2013.01); *G05D 1/0219* (2013.01); *G05D 1/0225* (2013.01); *H02S 20/32* (2014.12); *H02S 40/36* (2014.12); *H02S 40/38* (2014.12); *G05D 2201/0203* (2013.01); *G05D 2201/0215* (2013.01)

(58) Field of Classification Search
CPC ......... G05D 1/0219; G05D 2201/0203; G05D 2201/0215; G01S 3/7861; B08B 1/04; B08B 1/005; G01W 1/02
See application file for complete search history.

(56) References Cited

U.S. PATENT DOCUMENTS

| | | |
|---|---|---|
| 9,080,791 B1 | 7/2015 | Meller et al. |
| 9,130,502 B1 | 9/2015 | Aly et al. |
| 9,455,665 B1 | 9/2016 | Meller et al. |
| 9,931,009 B2 | 4/2018 | Miyake et al. |
| 10,391,637 B2 | 8/2019 | Miyake et al. |
| 10,797,636 B2 * | 10/2020 | Meller ................ B08B 1/04 |
| 2007/0142964 A1 | 6/2007 | Abramson |
| 2008/0011288 A1 | 1/2008 | Olsson |
| 2008/0140255 A1 | 6/2008 | Ziegler et al. |
| 2009/0049640 A1 | 2/2009 | Lee et al. |
| 2012/0040179 A1 | 2/2012 | Dave |
| 2013/0234645 A1 | 9/2013 | Goei et al. |
| 2015/0229265 A1 | 8/2015 | Morita et al. |
| 2015/0236640 A1 | 8/2015 | Miyake et al. |
| 2015/0272413 A1 | 10/2015 | Miyake et al. |
| 2016/0332748 A1 | 11/2016 | Wang |
| 2017/0164797 A1 | 6/2017 | Abramson et al. |
| 2018/0054156 A1 | 2/2018 | Lokey |
| 2019/0214940 A1 | 7/2019 | Allouche et al. |

FOREIGN PATENT DOCUMENTS

| | | |
|---|---|---|
| FR | 3022360 A1 | 12/2015 |
| JP | 5382916 B2 | 1/2014 |
| WO | 2010003115 A1 | 1/2010 |
| WO | 2014196480 A1 | 12/2014 |
| WO | 2015152431 A1 | 10/2015 |
| WO | 2018008033 A1 | 1/2018 |

OTHER PUBLICATIONS

International Search Report and Written Opinion of the International Searching Authority dated Apr. 5, 2018 for International Application No. PCT/US2018/015221 (17 Pages).
International Preliminary Report on Patentability for International Application No. PCT/US2018/015221, dated Apr. 12, 2019, eight (8) pages.

* cited by examiner

WATERLESS CLEANING SYSTEM AND METHOD FOR SOLAR TRACKERS USING AN AUTONOMOUS ROBOT

CROSS-REFERENCE TO RELATED APPLICATIONS

This international patent application claims priority to and the benefit of each of the following two provisional US patent applications and also each of the following two non-provisional US patent applications: provisional U.S. patent application Ser. No. 62/450,584 filed on Jan. 26, 2017; provisional U.S. patent application Ser. No. 62/470,342 filed on Mar. 13, 2017; non-provisional U.S. patent application Ser. No. 15/727,055 filed on Oct. 6, 2017; and non-provisional U.S. patent application Ser. No. 15/826,976 filed on Nov. 30, 2017. Each of these four US patent applications is incorporated in its entirety into this international patent application.

FIELD OF THE DISCLOSED TECHNIQUE

The disclosed technique relates to the cleaning of solar trackers, in general, and to methods and systems for cleaning solar trackers without water using an autonomous robot, also under various wind conditions, in particular.

BACKGROUND OF THE DISCLOSED TECHNIQUE

The challenges of global climate change and energy circuitry demands have made the development of renewable energy alternatives vital for the future of mankind. The use of direct sun radiation on solar panels can potentially produce more than enough energy to meet the energy needs of the entire planet. As the price of solar power decreases and the pollution caused by conventional fuels is rising, the solar business has entered a new era of worldwide growth.

In order to bring technologies to exploit solar energy one step closer up to par with conventional fuels, the efficiency rate of solar systems must improve. Solar panel efficiency depends amongst other things on the cleanliness of their surface. Energy losses caused by dust and soiling can reach over 40%. In desert areas, where many solar parks are located, the soiling and dust problem is significant.

A fast growing type of solar park is the solar tracker park. The solar trackers have the ability to follow the sun's position continuously from morning to evening by changing their tilt angle from east (in the morning) to west (in the evening) in order to increase efficiency. Automatic cleaning solutions for solar trackers usually involve high volumes of water and/or the installation of special grids in the solar tracker park for moving automatic cleaners from solar tracker to solar tracker. Such solutions are not cost effective and require added labor for installation.

Systems for cleaning solar panels are known in the art. US patent application publication no. 2015/0272413 A1 to Miyake et al., entitled "Autonomous-Travel Cleaning Robot" is directed to a self-propelled cleaning robot that can efficiently clean a flat surface even if a step is formed. The cleaning robot can self-travel on a structure to clean a flat surface of the structure, the structure being installed in an outdoor location. The robot includes a robot main body in which a self-propelled moving means is provided, a cleaning unit that is provided in a front portion and/or a rear portion of the robot main body, and a controller that controls activation of the moving means. The controller includes an attitude controller that detects an attitude of the robot main body. The attitude controller includes a floating detection sensor that detects floating in one of the front portion and the rear portion of the robot main body. The controller controls the activation of the moving means such that the cleaning unit passes through a place where the floating is detected after the floating is eliminated. Similar structures are disclosed in US patent application publication nos. 2015/0236640 A1 and 2015/0229265 A1.

Many state of the art solar trackers are covered with an anti-reflective coating for increasing solar energy production efficiency. The use of robotic cleaners travelling over such solar trackers can ruin and destroy the anti-reflective coating within a few months. This is due to the weight of the robotic cleaner travelling over the surface of the solar panels and to the force at which cleaning brushes on the robotic cleaner impact and press on the surface of the solar panels as the brushes clean the surface. Solar tracker park owners can thus increase solar energy production efficiency by reapplying the anti-reflective coating, thus increasing the costs of maintaining the solar tracker park, or by not using an anti-reflective coating, thus not maximizing solar energy production.

Solar trackers are used the world over and are located in locations which can have varying wind conditions. A concern for solar tracker park owners using a cleaning robot is the safety and durability of the cleaning robot under varying wind conditions. A heavier robotic cleaner, as mentioned above, may prevent the robotic cleaner from being lifted off the surface of a solar tracker under heavy wind conditions however the increased weight may ruin and destroy the anti-reflective coating used to increase solar energy production efficiency. There is thus a need for systems and methods for cleaning solar trackers using a cleaning robot wherein the weight of the robot will not ruin any anti-reflective coating on the solar trackers and wherein the safety of the cleaning robot is not compromised even under heavy wind conditions.

SUMMARY OF THE DISCLOSED TECHNIQUE

It is an object of the disclosed technique to provide a novel method and system for a solar tracker waterless cleaning system for cleaning solar panels of a solar tracker. The solar tracker is able to be positioned at a pre-determined angle. The solar tracker waterless cleaning system includes a docking station and an autonomous robotic cleaner (ARC). The docking station is coupled with an edge of the solar tracker. The ARC includes at least one rechargeable power source, at least one cleaning cylinder and a controller. The cleaning cylinder is for cleaning dirt off of a surface of the solar tracker without water and the controller is for controlling a cleaning process of the ARC and for transmitting and receiving signals to and from the ARC. The controller includes a motion sensor. The cleaning cylinder further includes a plurality of fins. The motion sensor is for determining an angle of the solar tracker and a heading of the ARC and the fins rotate for generating a directional air flow for pushing dirt off of the surface of the solar tracker. The docking station includes at least one electrical connector for recharging the rechargeable power source. The ARC can anchor in the docking station and the ARC cleans the solar tracker when the solar tracker is positioned at the pre-determined angle. The pre-determined angle is between −10 to +10 degrees from a horizontal angle of zero degrees. The motion sensor is used for navigating the ARC over the surface of the solar tracker. The fins touches the surface of the solar tracker when they rotate and the ARC cleans the solar tracker by the directional air flow and the touch of the fins pushing dirt off of the surface of the solar tracker.

In accordance with another aspect of the disclosed technique, there is thus provided a method for waterlessly cleaning a solar tracker including at least one autonomous robotic cleaner (ARC) which cleans without water. The ARC includes a motion sensor for navigation and the solar tracker is able to be positioned at a pre-determined angle. The method includes the procedures of positioning the solar tracker at the pre-determined angle during nighttime hours, calibrating the motion sensor to a local north of the solar tracker, providing a start clean signal to the ARC to clean a surface of the solar tracker and cleaning the solar tracker by using a directional air flow to push dirt off of the surface of the solar tracker. The pre-determined angle is between −10 to +10 degrees from a horizontal angle of zero degrees and the ARC navigates over the surface of the solar tracker using the motion sensor.

In accordance with a further aspect of the disclosed technique, there is thus provided a fixed angle solar table waterless cleaning system for cleaning solar panels of a solar table. The solar table is fixed at a pre-determined angle. The solar table waterless cleaning system includes a docking station and an autonomous robotic cleaner (ARC). The docking station is coupled with an edge of the solar table. The ARC includes at least one rechargeable power source, at least one cleaning cylinder and a controller. The cleaning cylinder is for cleaning dirt off of a surface of the solar table without water and the controller is for controlling a cleaning process of the ARC and for transmitting and receiving signals to and from the ARC. The controller includes a motion sensor for determining a heading of the ARC and the cleaning cylinder further includes a plurality of fins which rotates for generating a directional air flow for pushing dirt off of the surface of the solar table. The docking station includes at least one electrical connector for recharging the rechargeable power source. The ARC can anchor in the docking station. The pre-determined angle is between −10 to +10 degrees from a horizontal angle of zero degrees. The motion sensor is used for navigating the ARC over the surface of the solar table. The fins touch the surface of the solar table when they rotate and the ARC cleans the solar table by the directional air flow and the touch of the fins pushing dirt off of the surface of the solar table.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

Figure 1:
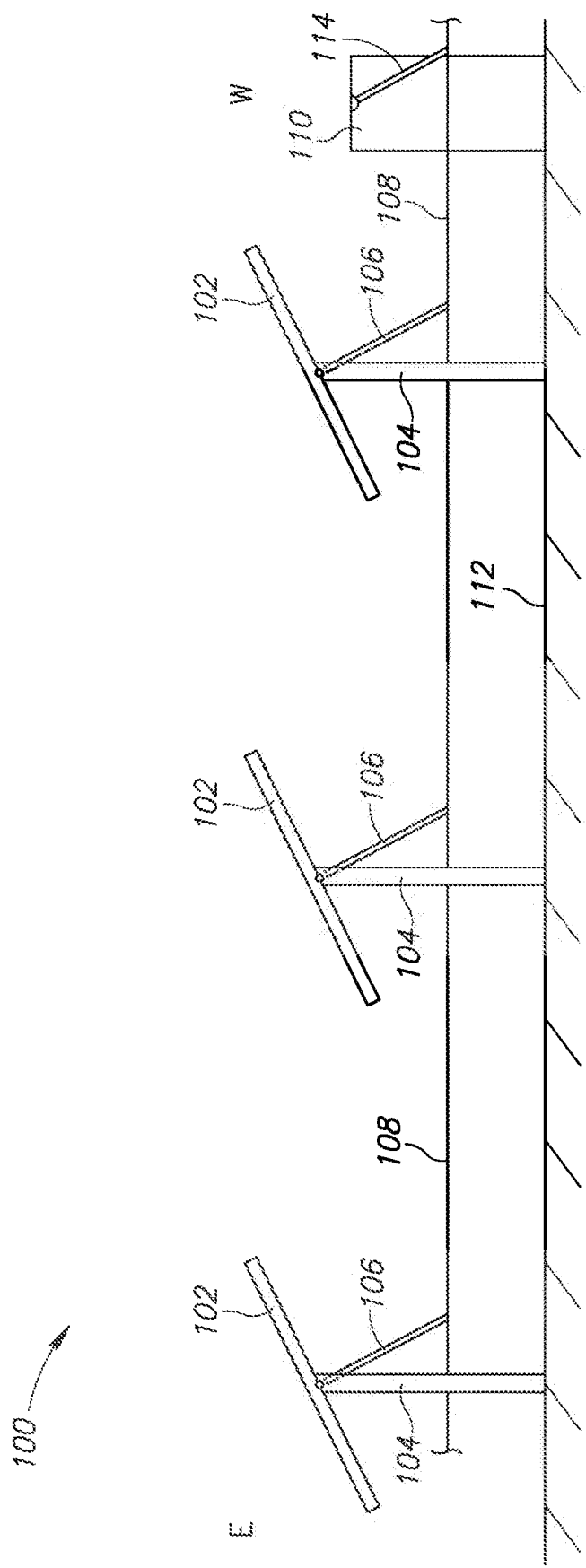
FIG. 1 is a side view of a plurality of solar trackers in a solar tracker park, constructed and operative in accordance with an embodiment of the disclosed technique.

The disclosed technique overcomes the disadvantages of the prior art by providing a solar tracker cleaning system and method without using water via the use of autonomous robotic cleaners (herein abbreviated ARC) which are lightweight and exert very low pressure on the surface of the solar panels of the solar tracker, thereby preserving any anti-reflective coating used on the surface of the solar panels. Each solar tracker (also referred to as a solar tracker table) in a solar tracker park is equipped with a docking station and an ARC that can clean the surface of a solar tracker autonomously. The robotic cleaner can return to the docking station by itself. The disclosed technique provides for a novel navigation system for the ARC using a 6-axis motion sensor, including an accelerometer and an electronic gyroscope, which is calibrated to a local north of the solar tracker at the beginning of each cleaning cycle. In addition, the docking station includes a locking mechanism which prevents the ARC from being lifted off the surface of the solar tracker and falling off the solar tracker regardless of wind direction, even under extreme wind conditions.

A solar tracker park includes a plurality of solar tracker tables. Each solar tracker table is constructed from a frame that can change its tilt angle from eastward in the morning to westward in the evening. The solar tracker tables are positioned horizontally in a north-south direction. Each frame includes a plurality of solar panels as well as an electromechanical mechanism for changing the tilt angle of the solar tracker table.

The tilt angle of the solar tracker tables is centrally controlled. The system and the method of the disclosed technique includes a plurality of ARCs, with each solar tracker table have its own individual ARC and a dedicated docking station. Each ARC is equipped with a rechargeable power source. When it is not in the process of cleaning a solar tracker table, the ARC is docked in the docking station where the rechargeable power source can be recharged, thus not interrupting the electricity production of the solar tracker table while also recharging itself. The docking station may be located on the northern or southern side of the solar tracker table (northern side for the northern hemisphere, southern side for the southern hemisphere), in order to avoid casting a shadow on the solar panels during daylight hours. The docking station also enables the ARCs to anchor themselves during periods of inclement weather thus avoiding the issue of ARCs falling off the solar tracker tables in bad weather or possibly damaging the solar panels of the solar tracker. The tilt angle of the solar trackers can be controlled to compensate for strong winds thus enabling the ARC to clean the surface of a solar tracker even under strong wind conditions. In addition, according to the disclosed technique, a novel cleaning pattern can be used by an ARC to move dust, dirt and debris off the surface of a solar tracker in the presence of wind conditions, thereby using the wind to increase the efficiency of the cleaning of the surface. According to the disclosed technique, the central controller of the solar tracker tables may include a weather center including instruments for measuring wind speed (anemometer), pressure (barometer), humidity (hygrometer) and other indicators of the weather. The central controller may also be coupled with a weather information center via a network. The central controller can aggregate weather information along with the tilt angle of the solar tracker tables over various periods of time to improve predictive maintenance of the solar tracker tables and also to enable machine learning of the maintenance cycle of the solar tracker tables.

According to the system and the method of the disclosed technique, in the nighttime hours (i.e., no sun) when no electricity is being produced, the solar tracker tables of the solar tracker park are brought, via the centrally controlled electromechanical mechanism, to a horizontal position, wherein the tilt angle (i.e., the east-west angle) is substantially zero. Cleaning the solar tracker tables whilst they are substantially horizontal (i.e., within a few degrees of zero degrees, for example ±10 degrees from the horizontal) simplifies the cleaning process as well as making the ARCs cost effective since the ARCs do not need strong motors and braking systems for ascending or descending an inclined solar tracker table. The ARCs can be modeled after floor cleaning autonomous robots, however unlike such autonomous robots the ARC of the disclosed technique does not require a bin, dust container or filter and can simply push dirt and debris off the surface of a solar tracker table. Once the solar tracker tables are horizontal, the ARC of each solar tracker table drives out of its docking station and cleans the horizontal surface of the solar tracker table. The ARC may move over the horizontal surface of the solar tracker table in a zigzag path, a scanning path, a sweeping path or other paths for cleaning the surface of the solar tracker table. The specific pattern the ARC uses for cleaning the surface of the solar tracker table may be determined based upon the current weather and wind patterns as determined by a weather center coupled with the solar trackers. The ARC is equipped with at least one edge sensor for preventing it from falling from the solar tracker table. Such edge sensors can be used to navigate the ARC along the edges of the solar tracker table. Virtual magnetic walls may also be added to the solar tracker tables as well as the installation of a low physical barrier to the edges of the solar tracker tables as additional measures for preventing the ARC from falling off the solar tracker tables. Many solar tracker tables have two sections. According to the disclosed technique, the two sections are coupled together via a bridge, such that once the ARC of a solar tracker table finishes cleaning a first section, it can then cross over the bridge to the second section and clean it as well. Once the second section is cleaned, the ARC can cross the bridge again and return to the docking station where it can anchor itself to a charging assembly. The charging assembly keeps the ARC firmly supported while not in use while also enabling it to couple with charging elements and to charge its rechargeable power source, such as a rechargeable battery. A locking mechanism is also provided thereby preventing the ARC from being lifted off the surface of the docking station and possibly falling off the solar tracker surface.

Furthermore, according to the disclosed technique, the ARC is equipped with a cleaning cylinder and fins which create a directional air flow for removing dirt, dust and debris from the surface of the solar tracker. The cleaning cylinder and fins are positioned on the ARC such that they make minimal contact with the solar panels, exerting a pressure on the surface of the solar panels of less than 0.1 grams per centimeter squared ($g/cm^2$), thus preserving the anti-reflective coating on the solar panels.

Reference is now made to FIG. 1 which is a side view of a plurality of solar trackers in a solar tracker park, generally referenced 100, constructed and operative in accordance with an embodiment of the disclosed technique. Shown in FIG. 1 are solar trackers 102, supporting poles 104 for the solar trackers, mechanical arms 106 that control the tilt angle of each solar tracker and a mechanical bar 108 that connects mechanical arms 106 of a number of solar trackers to an electromechanical controller 110. Electromechanical controller 110 includes a mechanical arm 114 which controls the tilt angle of the solar trackers via the movement of mechanical bar 108 and mechanical arms 106. Ground level 112 of the installation of the solar trackers is shown as well. Cardinal directions east (E) and west (W) are also shown.

Figure 2:
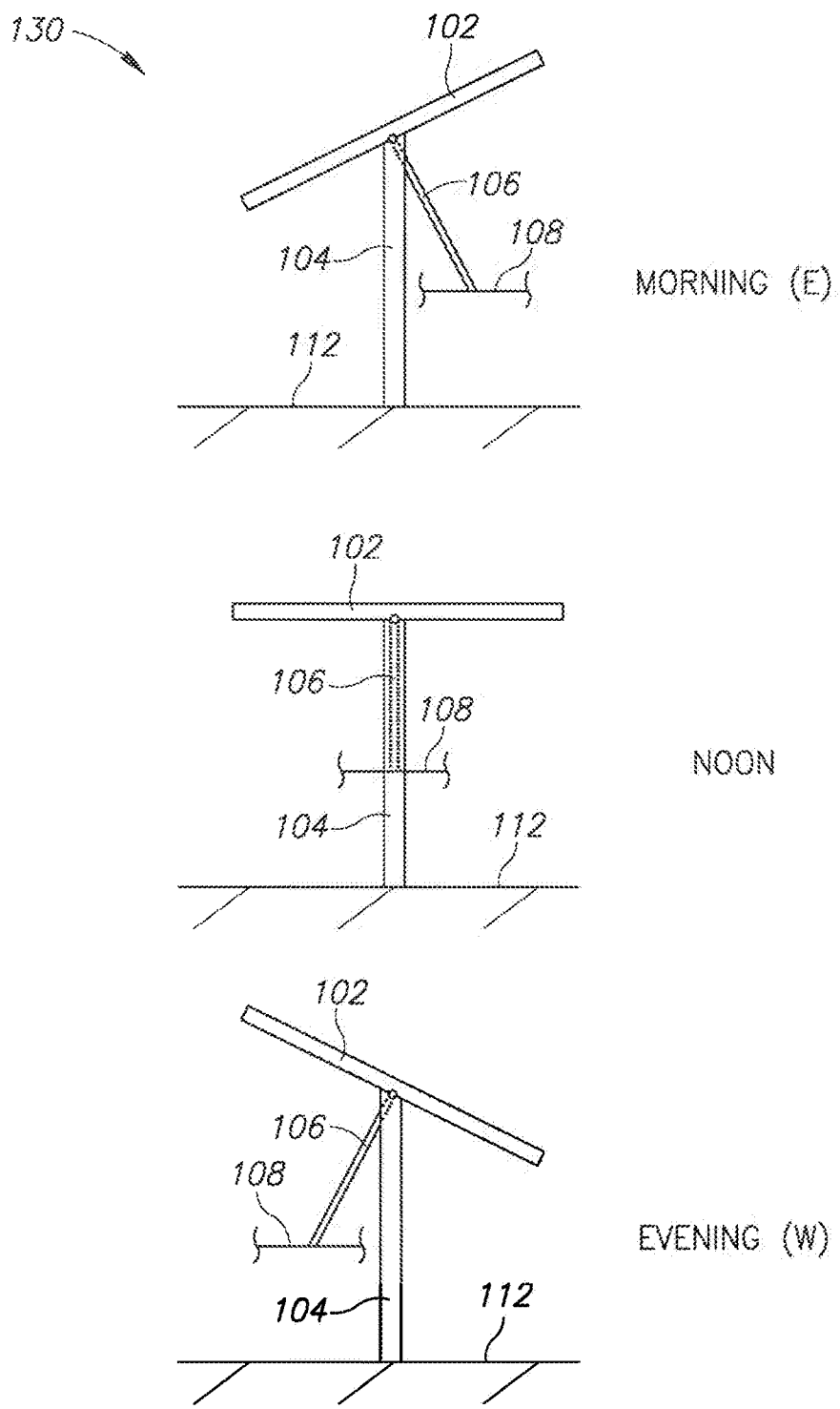
FIG. 2 is a side view of a solar tracker at various times of the day, constructed and operative in accordance with another embodiment of the disclosed technique.

Reference is now made to FIG. 2 which is a side view of a solar tracker at various times of the day, generally referenced 130, constructed and operative in accordance with another embodiment of the disclosed technique. From top to bottom in FIG. 2, a solar tracker is shown in the morning hours as the sun rises from the east, at high noon where the solar tracker is substantially in a flat position and in the afternoon hours as the sun sets in the west. Identical reference numbers to FIG. 1 are used in FIG. 2.

As shown, a solar tracker park includes a plurality of solar trackers. Each solar tracker may be a large single solar panel or a plurality of solar panels placed adjacent to one another. Each solar tracker is constructed from a construction frame that can change its tilt angle from eastward in the morning to westward in the evening, as shown in FIG. 2. In a solar tracker park, the solar trackers are positioned horizontally in a north to south direction. The plurality of solar panels is attached to the construction frame. And as shown in FIG. 1, an electromechanical mechanism, such as via mechanical bar 108, is used to change the tilt angle of the solar tracker.

Figure 3:
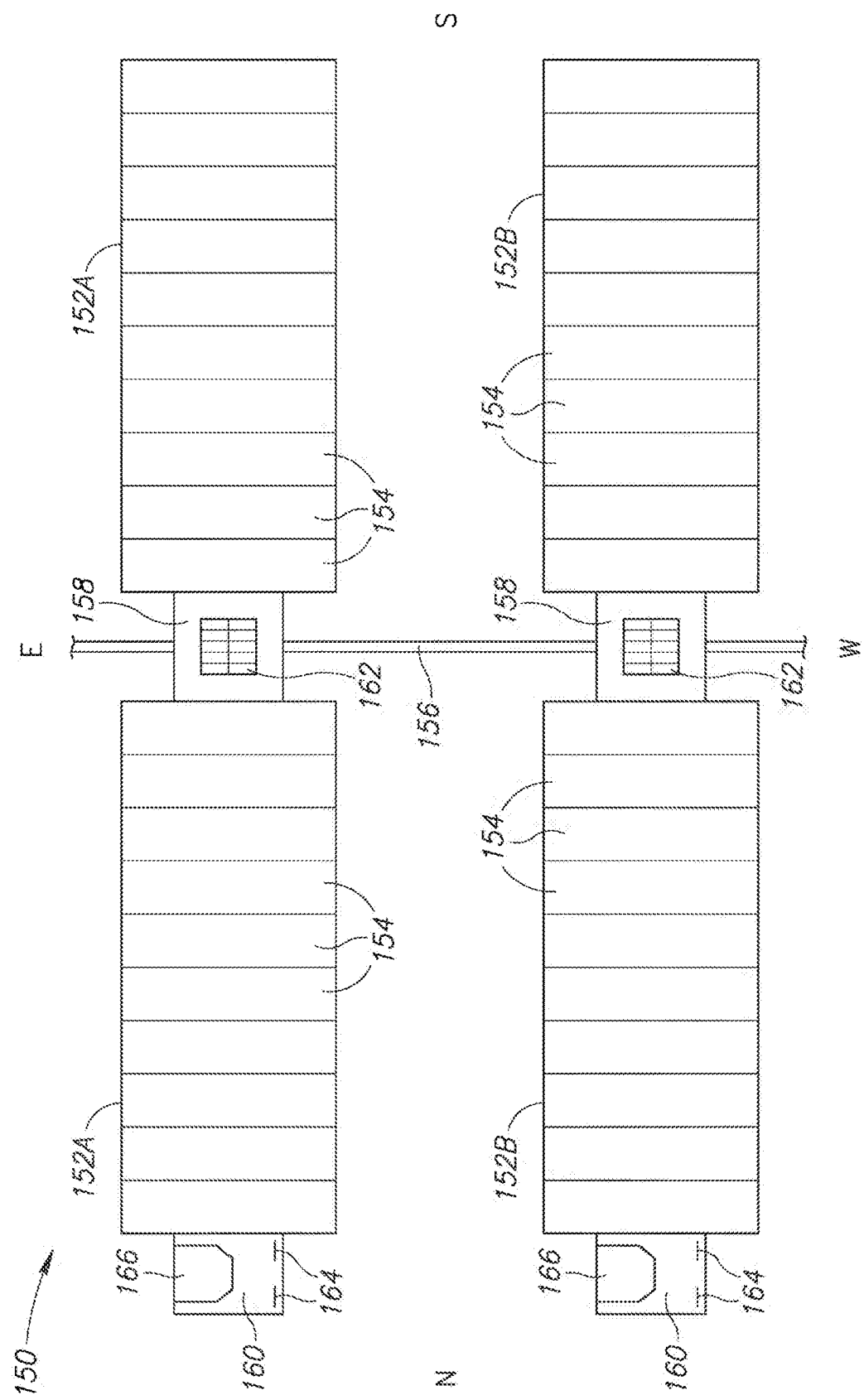
FIG. 3 is a top view of two neighboring solar trackers including robotic cleaners, constructed and operative in accordance with a further embodiment of the disclosed technique.

Reference is now made to FIG. 3 which is a top view of two neighboring solar trackers including robotic cleaners, generally referenced 150, constructed and operative in accordance with a further embodiment of the disclosed technique. As shown are two solar tracker tables 152A and 152B. Solar tracker tables 152A and 152B are substantially similar to solar trackers 102 (FIG. 1) and are positioned in a north-south direction (as shown) such that they can tilt from east to west (also shown) during the course of a day. Many solar tracker tables include two sections, such as shown in FIG. 3. Each of solar tracker tables 152A and 152B are made up of a plurality of solar panels 154. Plurality of solar panels 154 may be covered with an anti-reflective coating (not shown) for increasing solar energy production efficiency. According to the disclosed technique, the two sections of each solar tracker are coupled together via a bridge 158. Bridge 158 may be equipped with a solar panel 162 for generating electricity for charging the rechargeable power source of the ARC of the disclosed technique, as explained below. Solar panel 162 is different than plurality of solar panels 154 which make up each solar tracker table as the electricity generated from plurality of solar panels 154 is used by the solar tracker park to store electricity that can be sold to clients where the electricity generated from solar panel 162 is used to recharge and power the ARC of the disclosed technique. In addition, one of the sections of solar tracker tables 152A and 152B may be equipped with a docking station 160. Docking station 160 may be located on the northern side or the southern side of the solar tracker table depending on which hemisphere the solar tracker table of the disclosed technique is installed in. Docking station 160 includes a plurality of anchoring elements 164 and a charging assembly (not shown in FIG. 3) for housing an ARC 166, which is merely shown schematically in FIG. 3. Details of ARC 166 are provided below in FIGS. 4 and 5. Plurality of anchoring elements 164 enable ARC 166 to be anchored to docking station 160 during periods of inclement weather. Plurality of anchoring elements 164 may form part of the charging assembly (not shown) such that ARC 166 can be anchored and recharged simultaneously. Details of docking station 160 are shown below in FIG. 4. Details of another embodiment of docking station 160 are shown below in FIG. 6-8. As an autonomous robot, ARC 166 can move in a variety of patterns and paths over the surface of a solar tracker, for example in a zigzag path (not shown), for cleaning the entire surface of solar trackers 152A and 152B.

It is noted that when solar tracker tables 152A and 152B are installed, they are preferably positioned in a north-south direction however the actual direction of solar tracker tables 152A and 152B is dependent on the instruments and calibration used when installed. For example, solar tracker tables 152A and 152B may be installed with docking station 160 facing magnetic north, true north or a deviation from one of those directions, depending on the instruments used during the solar tracker installation and how they were calibrated (or miscalibrated). As described below, according to the disclosed technique, regardless of the actual direction a solar tracker is positioned, the ARC of the disclosed technique calibrates itself to a local north of the solar tracker table itself, thereby increasing the navigation accuracy of the ARC.

Figure 4:
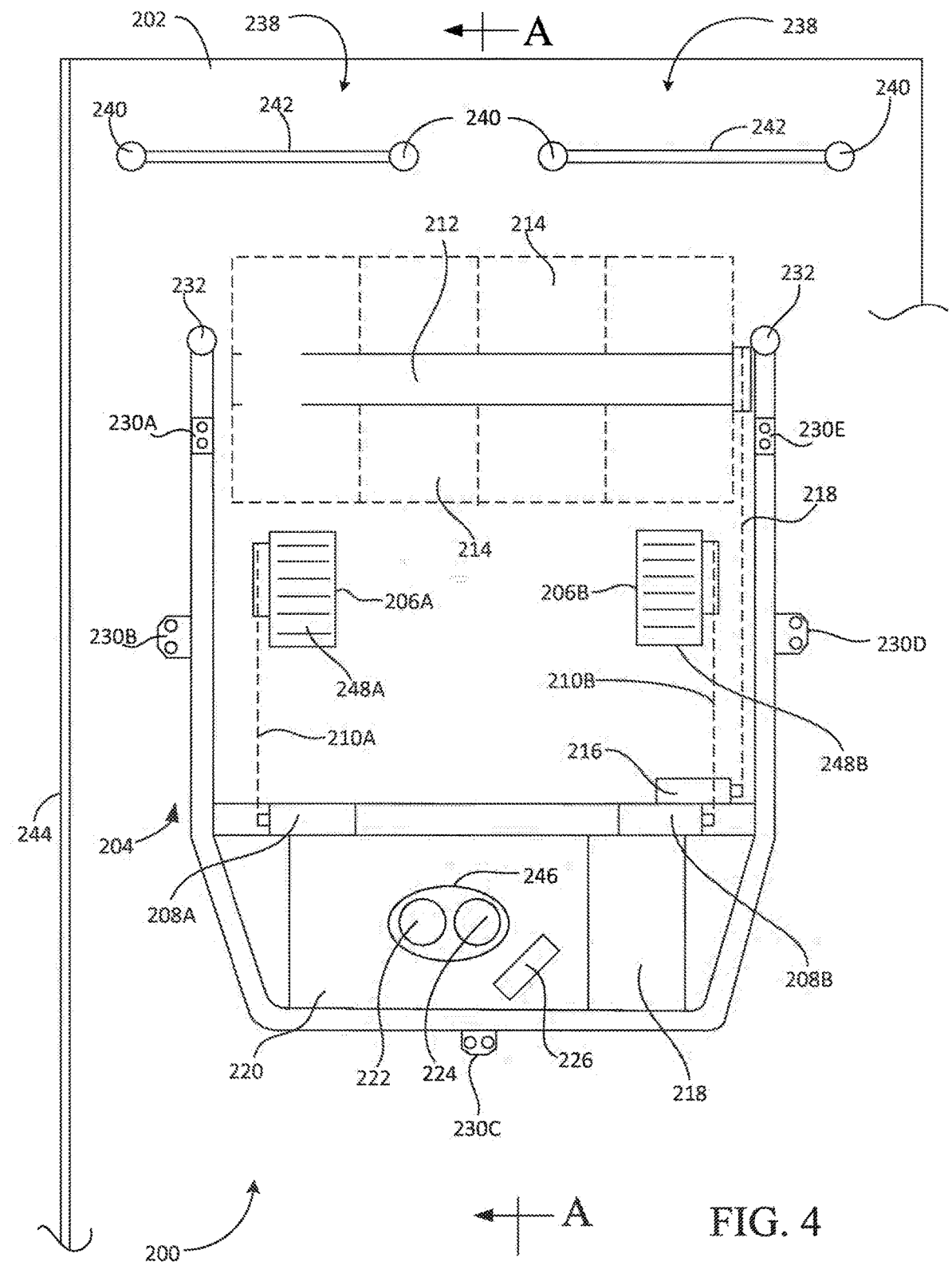
FIG. 4 is a detailed top see-through view of a first robotic cleaner and a first docking station, constructed and operative in accordance with another embodiment of the disclosed technique.

Reference is now made to FIG. 4 which is a detailed top see-through view of a first robotic cleaner and a first docking station, generally referenced 200, constructed and operative in accordance with another embodiment of the disclosed technique. FIG. 4 shows a first docking station 202 and an ARC 204, which are substantially similar to docking station 160 and ARC 166 (FIG. 3) respectively yet shown in greater detail. ARC 204 may have a plastic body or may be made from other materials (not shown). ARC 204 includes a left drive wheel 206A, a right drive wheel 206B, a left direct current (herein abbreviated DC) drive motor 208A and a right DC drive motor 208B. Left drive wheel 206A includes a left wheel encoder 248A and right drive wheel 206B includes a right wheel encoder 248B. A left drive belt 210A couples left drive wheel 206A to left DC drive motor 208A such that left DC drive motor 208A can drive left drive wheel 206A. A right drive belt 210B couples right drive wheel 206B to right DC drive motor 208B such that right DC drive motor 208B can drive right drive wheel 206B. Left wheel and right wheel encoders 248A and 248B can be embodied as proximity sensors and can read the revolutions of each of left drive wheel 206A and right drive wheel 206B respectively. For example, left wheel and right wheel encoders 248A and 248B can count the number of links or ribs in either the drive wheels or the drive belts. In one example, the drive wheels may have 6 pulses per revolutions, 12 pulses per revolution, or any other number of pulses per revolution, where each pulse can be counted and read by left wheel and right wheel encoders 248A and 248B. Thus left wheel and right wheel encoders 248A and 248B can be used to determine the angular positions of left drive wheel 206A and right drive wheel 206B. Together with a control unit 220 (explained below), the wheel encoders enable the control of the turning as well as the linear motion of ARC 204 over the surface of a solar tracker. ARC 204 further includes a cleaning cylinder 212. A plurality of fins, for example a plurality of microfiber fins 214 are coupled with cleaning cylinder 212 for cleaning the surface of a solar tracker table. Plurality of microfiber fins 214 are used for pushing dirt off the surface of a solar tracker table by creating a directional air flow or stream over the surface of the solar panels of the solar tracker table. The direction air flow enables the pressure plurality of microfiber fins 214 exerts on the surface of the solar panels to be less than 0.1 $g/cm^2$, which should not damage the anti-reflective coating on the surface of the solar panels. As noted above, according to the disclosed technique, ARC 204 does not include nor does it require a vacuum bin for collecting debris and dirt or a filter. ARC 204 also includes a cleaning cylinder DC drive motor 216 and a cleaning cylinder drive belt 218 for coupling cleaning cylinder DC drive motor 216 with cleaning cylinder 212 for driving it. ARC 208 further includes a control unit 220 (which can also be referred to simply as a controller). Control unit 220 includes an at least 6-axis motion sensor 246, a swivel wheel 226 and a rechargeable power source 228. At least 6-axis motion sensor 246 includes an electronic gyroscope 222 and an accelerometer 224. At least 6-axis motion sensor 246 can also be embodied as a 9-axis sensor with the functioning of the magnetometer not being used. At least 6-axis motion sensor 246 can embodied as a motion sensor detecting more than six axes of movement. It is noted that swivel wheel 226 can be replaced with any supporting structure such as a brush, a piece of plastic, a piece of rubber and the like, for supporting the rear end of ARC 204. The supporting structure does not need to move or have moveable parts but should be smooth enough so as not to cause any damage to the surface of the solar tracker table as the ARC moves over its surface. Control unit 220 may also include a processor (not shown) and a wireless transmitter-receiver (not shown). Control unit 220 controls the operation of ARC 204, including receiving commands and transmitting information from the ARC (for example via the wireless transmitter-receiver) to a central controller (not shown). Accelerometer 224 can identify the tilt position as well as the movement of ARC 204. Electronic gyroscope 222 can identify the heading of ARC 204 while it is stationary or while it is moving. At least 6-axis motion sensor 246 is used by control unit 220 for navigating ARC 204 over the surface of a solar tracker table. It is noted that at least 6-axis motion sensor 246 can also be embodied as a 9-axis motion sensor, including a magnetometer (not shown) as well. At least 6-axis motion sensor 246 can be embodied using any known motion sensor that combines at least an accelerometer with an electronic gyroscope, for example the BNO080 9-axis SiP from Hillcrest Labs™ and other similar motion sensors.

Swivel wheel 226 supports the rear portion of ARC 204 while allowing it full maneuverability. As mentioned above, swivel wheel 226 can be embodied as a support structure that does not involve a wheel and may be simply a piece of rubber or plastic. Rechargeable power source 228 may be a rechargeable battery, such as a 12 volt Ni-MH (nickel-metal hydride) battery but can also be embodied as other types of rechargeable batteries such as lead acid, lithium ion, LiFePO4, NiCad and the like. ARC 204 further includes a plurality of recharge connectors 232, as explained below.

In addition, ARC 204 includes at least one edge sensor, such as a proximity sensor, for identifying and determining an edge of a solar tracker table. In one example, as shown in FIG. 4, ARC 204 includes five proximity sensors 230A-230E, however this is merely an example and any number of proximity sensors can be used. Due to the general dusty conditions under which solar tracker tables are used, the edge sensor or proximity sensor may be preferably embodied as an ultrasonic proximity sensor however other types of sensors, such as IR sensors, capacitance sensors and the like, can be used. As mentioned above, the proximity sensors are used with control unit 220 to prevent ARC 204 from falling off the side of the solar tracker table and also for allowing ARC 204 to move accurately along the edges of the solar tracker table. A cross-sectional view of ARC 204 along line A-A is shown below and explained in FIG. 5.

FIG. 4 also shows the components of first docking station 202, including a plurality of anchoring elements 238 and a physical barrier 244. Physical barrier 244 may be specifically positioned on the northern side of first docking station 202 (in a northern hemisphere installation) for use in calibrating electronic gyroscope 222 at the start of a cleaning process, as described below. In a southern hemisphere installation, the physical barrier may be positioned on the southern side of the docking station. Plurality of anchoring elements 238 is substantially similar to plurality of anchoring elements 164 (FIG. 3). The anchoring elements are used for anchoring and recharging rechargeable power source 228 of ARC 204. Each one of plurality of anchoring elements 238 includes a conductive bar 242, which can be made from a conductive metal such as stainless steel alloy 316 or other alloys, as well as a plurality of supporting elements 240 coupled at the ends of each conductive bar. Conductive bar 242 is used to anchor and charge the ARC on the east side or the west side of first docking station 202. In one embodiment of the disclosed technique, first docking station 202 may include a plurality of anchoring elements on both the east side and the west side of the docking station. Supporting elements 240 are flexible and with each supporting element 240 including a spring (not shown) for ensuring proper conductivity for recharging rechargeable power source 228. As mentioned above ARC 204 includes a plurality of recharge connectors 232 for coupling ARC 204 with conductive bar 242. Plurality of recharge connectors 232 are coupled with rechargeable power source 228. Also as mentioned above, first docking station 202 may include physical barrier 244, which may be embodied as a vertical wall, for stopping ARC 204 while it moves into first docking station 202. Physical barrier 244 can also be used in the calibration process of at least 6-axis motion sensor 246, in particular in calibrating electronic gyroscope 222.

Figure 5:
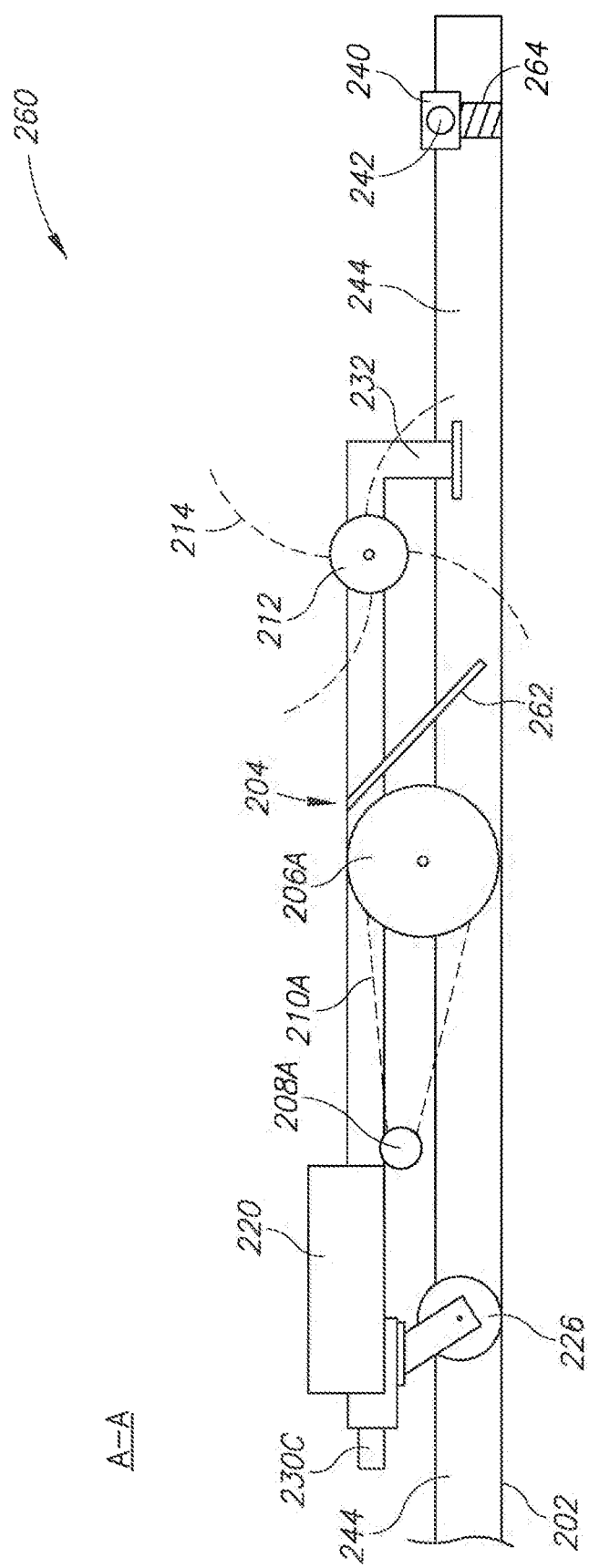
FIG. 5 is a cross-sectional view of the robotic cleaner of FIG. 4 along a line A-A, constructed and operative in accordance with a further embodiment of the disclosed technique.

Reference is now made to FIG. 5 which is a cross-sectional view of the robotic cleaner of FIG. 4 along a line A-A, generally referenced 260, constructed and operative in accordance with a further embodiment of the disclosed technique. All elements and parts in FIG. 5 are shown and have been explained above in FIG. 4 except for a few. Therefore identical reference numbers are used in FIG. 5 for identical elements shown in FIG. 4. FIG. 5 additionally shows a spring 264 which supports supporting element 240, enabling springiness and flexibility in supporting element 240 and conductive bar 242. Shown additionally is an angular flat element 262 positioned adjacent to cleaning cylinder 212 for improving the cleaning process by increasing the strength of the directional air flow generated by plurality of microfiber fins 214. Angular flat element 262 improves the cleaning process by directing the air flow generated by plurality of microfiber fins 214 forward and thus absorbs some of the dust particles which may fly backwards while cleaning cylinder 212 rotates plurality of microfiber fins 214. Angular flat element 262 makes the directional air flow of plurality of microfiber fins 214 powerful and strong and thereby reduces impact and pressure on the anti-reflective coating of the solar panels.

Figure 6:
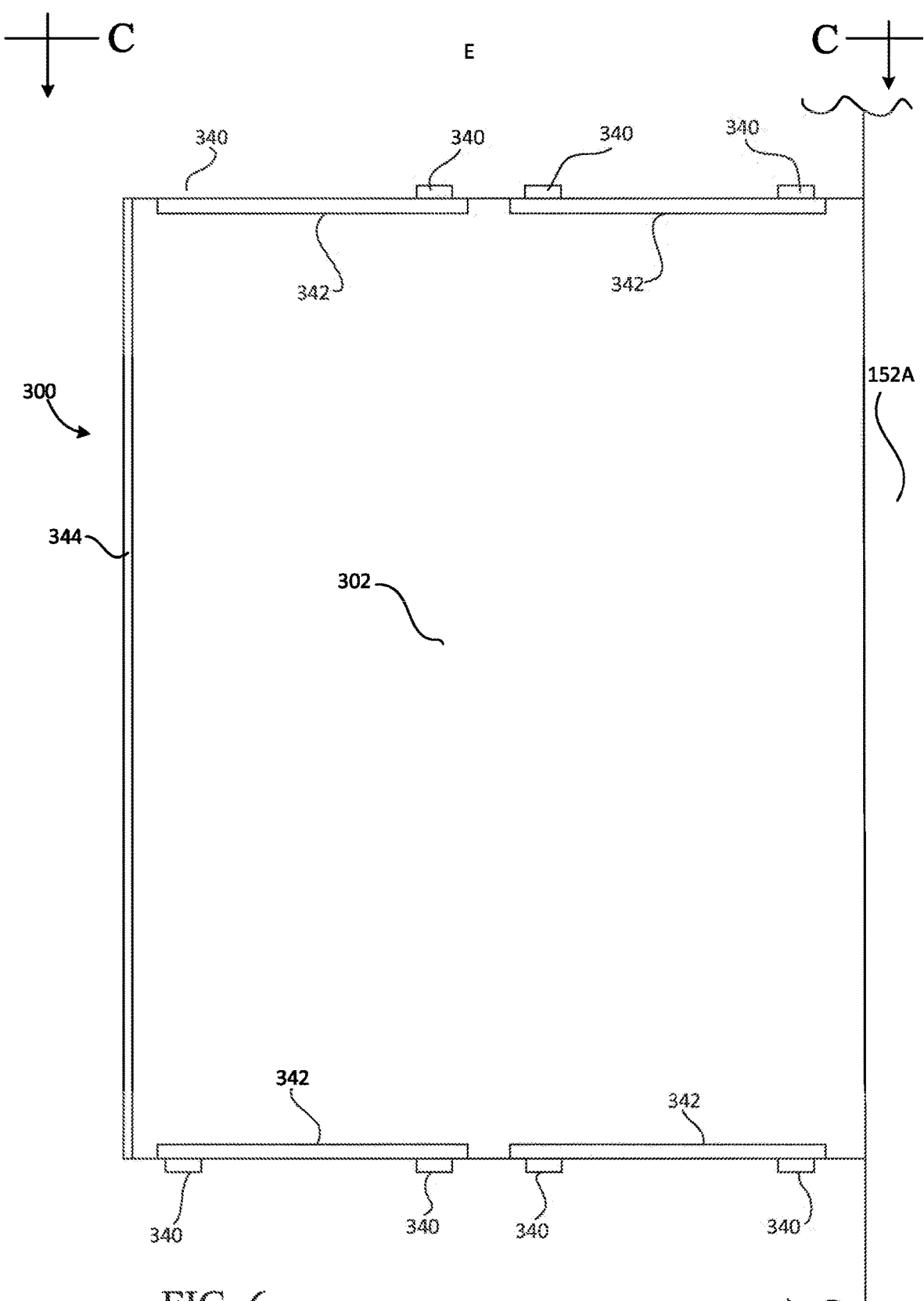
FIG. 6 is a top view of a second docking station, constructed and operative in accordance with another embodiment of the disclosed technique.

Reference is now made to FIG. 6 which is a top view of a second docking station, generally referenced 300, constructed and operative in accordance with another embodiment of the disclosed technique. Similar to first docking station 202 (FIG. 4), second docking station 300 is positioned at the northern end of a solar tracker table 152A (FIG. 3) in the northern hemisphere (and in the southern end in the southern hemisphere). Second docking station 300 includes a docking surface 302, a plurality of supporting elements 340, a plurality of conductive bars 342 and a protective wall 344. Plurality of supporting elements 340 couple plurality of conductive bars 342 to docking surface 302. Plurality of supporting elements 340 can be made from any non-conductive material, such as polycarbonate, and are electrically isolating elements. Each supporting element provides mechanical support and sufficient rigidity to a conductive bar and is used to position a conductive bar at the appropriate height and levelness relative to docking surface 302 such that an ARC (not shown) can recharge in the docking station. Plurality of conductive bars 342 can be made from any conductive material, such as a conductive alloy, stainless steel type 316 and the like. Plurality of conductive bars 342 is coupled with solar panel 162 (FIG. 3) or any other source of energy for recharging the ARC. The electrical coupling can be via a conducting wire (not shown). Plurality of conductive bars 342 are similar to conductive bars 242 (FIG. 4) and are positioned at a height and distance such that recharge connectors 232 (FIG. 4) of an ARC can couple with then to begin a recharge process. As shown, plurality of conductive bars 342 are positioned in an eastern side and western side of docking surface 302, as shown by the letters 'E' and 'W' in FIG. 6.

Figure 7:
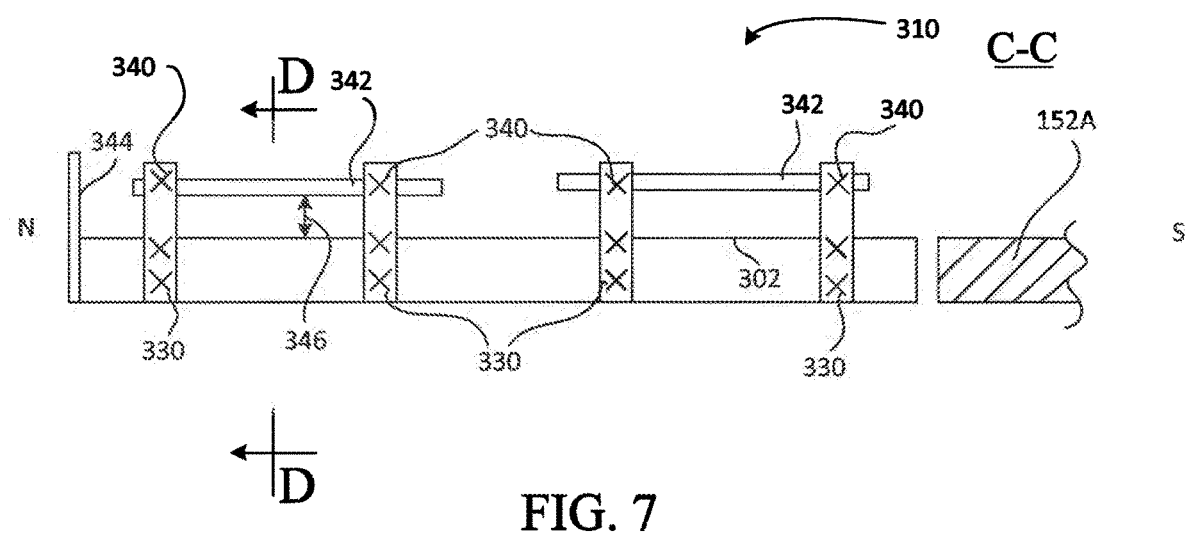
FIG. 7 is a side view of the second docking station of FIG. 6, along a line C-C of FIG. 6, constructed and operative in accordance with a further embodiment of the disclosed technique.

Reference is now made to FIG. 7 which is a side view of the second docking station of FIG. 6, along a line C-C of FIG. 6, generally referenced 310, constructed and operative in accordance with a further embodiment of the disclosed technique. Identical reference numbers to FIG. 6 are used in FIG. 7 to show the same elements as shown in FIG. 6. FIG. 7 shows that each one of plurality of supporting elements 340 is coupled to docking surface 302 with a plurality of screws 330 and is sufficiently long to be positioned at a height 346 at which each two of plurality of supporting elements 340 is coupled with one of plurality of conductive bars 342. Plurality of screws 330 can be embodied as any kind of fastener or rivet. Shown as well, protective wall 344 is substantially at the same height at plurality of conductive bars 342 and is used to prevent an ARC from falling off docking surface 302 and also in the procedure of calibrating the electronic gyroscope of the ARC.

Figure 8:
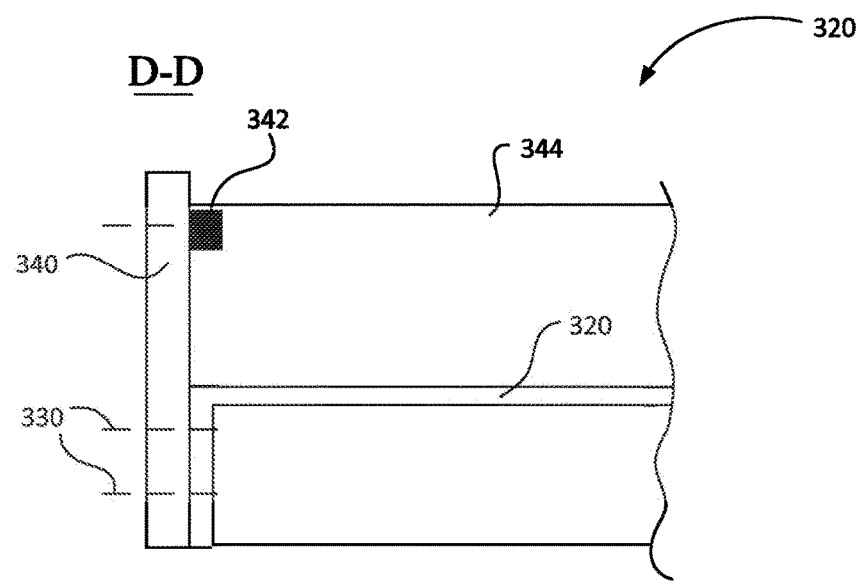
FIG. 8 is another side view of the second docking station of FIG. 6, along a line D-D of FIG. 7, constructed and operative in accordance with another embodiment of the disclosed technique.

Reference is now made to FIG. 8 which is another side view of the second docking station of FIG. 6 along a line D-D of FIG. 7, generally referenced 320, constructed and operative in accordance with another embodiment of the disclosed technique. Identical elements in FIG. 8 already described in FIGS. 6 and 7 are shown using identical reference numbers. Visible in FIG. 8 is the coupling of a supporting element 340 to both docking surface 302 and conductive bar 342 using plurality of screws 330.

With reference back to FIG. 6, an ARC (not shown) is recharged in docking station 300 in the follow manner. As docking station 300 is coupled with solar tracker table 152A, docking station 300 tilts with solar tracker table 152A. During the morning hours, until about noon, solar tracker table 152A faces eastward. The ARC is positioned such that its recharge connectors face eastward as well. Due to the tilt angle of the solar tracker table for most of the morning hours, enough pressure is exerted by gravity on the recharge connectors of the ARC to electrically couple then with plurality of conductive bars 342, thereby enabling the rechargeable batteries of the ARC to recharge. Around noon time, solar tracker table 152A is substantially horizontal and into the afternoon, begins to tilt in a westward direction. Once the at least 6-axis motion sensor of the ARC senses that the solar tracker table has tilted sufficiently in a westward direction, control unit 220 (FIG. 4) may give a command to the ARC to make a 180° turn such that the recharge connectors now face the westward facing conductive bars. Again, due to gravity, the ARC will exert enough pressure on the conductive bars on the west end of docking surface 302 to couple the recharge connectors such that the ARC can continue recharging as the solar tracker table tilts westwardly during the afternoon hours. The ARC may stay in that position until electricity production of the solar tracker tables has ceased once the sun has set. As described below, the solar tracker tables are then brought to a horizontal position, at which point the ARC then begins a cleaning cycle. In another embodiment of the disclosed technique, the front end of the ARC, opposite the end of recharge connectors 232 (FIG. 4), may also be equipped with additional recharge connectors (not shown) such that when solar tracker table 152A begins tilting in a westward direction, the ARC can be given a command to move forward and couple with the conductive bars on the other side of the docking surface and can continue its recharge cycle if needed.

As noted, since plurality of conductive bars 342 are solid and are accurately positioned relative to docking surface 302 and solar tracker table 152A. Therefore, before a cleaning cycle begins, the ARC may use the conductive bars on the westward side to calibrate the electronic gyroscope of the ARC to a local northern direction. Alternatively, before a cleaning cycle begins, the ARC may turn towards protective wall 344, which is positioned in a northern direction, in order to calibrate the electronic gyroscope of the ARC to a local northern direction. The conductive bars on the eastward side can also be used to calibrate the electronic gyroscope of the ARC. It is further noted that the main difference between first docking station 202 (FIG. 4) and second docking station 300 is that first docking station 202 uses springs to mount conductive bars at the height of the recharge connectors of the ARC whereas second docking station 300 uses supporting elements which are rigid.

With reference back to FIG. 3, the ARC of the disclosed technique can also be equipped with additional brushes, microfibers and cleaning elements for cleaning the surface of a solar tracker. In other embodiments, the docking stations of the disclosed technique (any one of docking stations 160, 202 or 300) does not need to include a structure for emptying a dust bin as the ARC may simply push dust and debris off the surface of a solar tracker and thus the ARC is not equipped with a dust container, such as shown above in ARC 204 (FIG. 4). As shown above and as described, ARC 204 is a waterless cleaner and clean the surface of a solar tracker either by pushing dirt and debris off the surface or by using air suction. According to the disclosed technique, by positioning the solar trackers of a solar tracker park in a horizontal position, an autonomous robot, such as those known from the vacuum cleaning industry, can be used to clean the surface of solar trackers autonomously. In a horizontal position, an autonomous robot does not have to deal with issues of the force of gravity either in ascending an inclined solar tracker table or braking when descending such a solar tracker table. As is known in the vacuum cleaning industry, various algorithms can be used to ensure that ARC 204 covers the entire surface of a solar tracker table and thus cleans the entire solar tracker table. In some embodiments of the disclosed technique, ARC 204 may further include cameras and sensors (not shown) for detecting defects on the surface of a solar panel. ARC 204 may include at least one of a light source, a visible light camera, an infrared light source and an infrared camera, for detecting defects on the surface of a solar tracker.

Docking station 160 is shown with ARC 166 in a parked position between plurality of anchoring elements 164. In one embodiment, in a parked position, ARC 166 can couple with electrical connectors (not shown) at the edges of docking station 166 for recharging the rechargeable power source of ARC 166. Alternatively, as shown, ARC 166 can couple with plurality of anchoring elements 164 which include conductive bars for simultaneously recharging the rechargeable power source of ARC 166 while also anchoring ARC 166. As shown, bridge 158 is wide enough for ARC 166 to pass onto either side of the solar tracker. According to the disclosed technique, a plurality of ARCs is used such that each solar tracker table has its own individual ARC. Each individual ARC is parked in the docking station of a given solar tracker while not in a cleaning process and thus does not interrupt the electricity production of the given solar tracker. As shown, the docking station is external to the solar panels of a solar tracker to avoid casting a shadow on the solar panels of the solar tracker during daylight hours.

Since the tilt angle of the solar trackers is centrally controlled, according to the system and the method of the disclosed technique, in the evening hours when no electricity is being produced from solar energy, the solar trackers of the solar tracker park are brought to a horizontal position. A horizontal position means that the east and west tilt angle is substantially zero and is substantially the position of a solar tracker at high noon. According to the disclosed technique, the horizontal position can be anywhere between ±10° of a horizontal tilt angle (i.e., up to 10° titled in a westward direction or up to 10° tilted in an eastward direction). Once substantially horizontal, each ARC of each solar tracker is given a cleaning command to move out from its respective docking station and to clean the horizontal surface of the solar tracker. As mentioned above, in one example, a zigzag path can be used to cover and clean the entire surface of a solar tracker. Other cleaning paths, as described below, can be used as well. Each ARC includes edge sensors or proximity sensors that prevent it from falling off the sides of a solar tracker. This is aided by the solar trackers being specifically brought to a horizontal position for cleaning, thus avoiding the additional issues and complexities of cleaning a solar tracker table which is at an incline. In some embodiments, additional physical and/or virtual structures may be added to a solar tracker table to prevent an ARC from falling over the edge, such as a virtual magnetic wall which the ARC can detect or even the installation of a low physical barrier to the perimeter edge of the solar tracker. As mentioned above, most of solar trackers have two sections, so the ARC may finish cleaning a first section and then will move through bridge 158 to the other section. As explained above, when the cleaning is done the ARC can autonomously travel back to docking station 160 over bridge 158, anchor itself safely between the anchoring elements and couple with electrical connectors for recharging.

A control and communication system (not shown) which is part of the solar tracker park may be used to initiate the start of the cleaning process of the plurality of ARCs as well as to ensure that all ARCs have returned to their parking positions once the cleaning process has completed. Each ARC may additionally have a sensor ensuring that a cleaning process starts only when a solar tracker is level and in a horizontal position (or within a tilt angle of ±10 degrees). For example, accelerometer 224 (FIG. 4) may be used to ensure that a cleaning process only begins when a solar tracker table is level. The control and communication system can also send out a stop cleaning signal in case of inclement weather conditions such as humidity, wind or rain. The control and communication system can be embodied as a short range wireless network using protocols such as ZigBee or XBee. According to the disclosed technique, other wireless communication protocols can be used as well. It is noted that in the event of inclement weather during the cleaning process, the control and communication system may give a command to the ARCs to return to docking station 160 and to anchor themselves to plurality of anchoring elements 164 to avoid the ARCs falling off the solar tracker tables due to the bad weather. Once the inclement weather subsides, provided the sun has not risen yet, the ARCs may be provided with a continue cleaning command to resume the cleaning cycle they had previously started. Light sensors, wind sensors, pressure sensors, humidity sensors, rain sensors and other weather related sensors can be used to automatically determine if inclement weather conditions are present in the vicinity of the solar tracker park.

With reference back to FIGS. 4 and 5, in this embodiment of the ARC, cleaning of the surface of the solar tracker tables is done by at least one cleaning cylinder 212 equipped with a plurality of microfiber fins 214. According to the disclosed technique, one or more rotational cylinders can be used to effect the cleaning of the solar tracker table surface. Furthermore, plurality of microfiber fins 214 may be made from other fabric, textile or cloth materials. In one embodiment of the disclosed technique, the width of the microfiber fins may be 100 millimeters (herein mm) and the radial size of the microfiber fins may be between 200 to 240 mm. It is noted that other dimensions can be used. The aforementioned dimensions of the microfiber fins may ensure an optimal generation of a directional air stream. Cleaning of the solar tracker table surface is achieved by the generated directional air stream together with angular flat element 262 and also by the very soft touch and low exerted pressure of less than 0.1 g/cm$^2$ of the plurality of microfiber fins which push dust and debris on the solar tracker table surface over the edge of the solar tracker table. According to the disclosed technique, the ARC cleans a solar tracker table while the solar tracker table is in a horizontal position but can also clean if the solar tracker table has a slight tilt angle of up to ±10 degrees from its horizontal position.

The motion and the maneuvering of the ARC on the surface of a solar tracker table is controlled by control unit 220 and its processor (not shown), using left drive wheel 206A and right drive wheel 206B which are driven by left DC drive motor 208A and right DC drive motor 208B respectively and also using left wheel encoder 248A and right wheel encoder 248B. ARC 204 moves forwards and backwards when left drive wheel 206A and right drive wheel 206B rotate in the same direction with the same speed. ARC 204 will spin around when left drive wheel 206A and right drive wheel 206B rotate in opposite directions. Maneuvering to the right or to the left of the ARC is done by controlling the pulse width modulation of left DC drive motor 208A and right DC drive motor 208B which can be controlled by the processor. Control unit 220 thus controls the cleaning process of the ARC. The number of pulses of each drive motor can be measured using left wheel encoder 248A and right wheel encoder 248B, thereby precisely controlling the positioning of the ARC.

As mentioned above, each ARC is equipped with an at least 6-axis motion sensor, including an accelerometer and an electronic gyroscope, as well as (for example, in the embodiment shown in FIG. 4) five proximity sensors that can sense the edges of the solar tracker table which together are controlled by control unit 220. As mentioned above, each of left DC drive motor 208A and right DC drive motor 208B includes at least one encoder for counting the angular status of each drive motor which can be provided to control unit 220 for determining the angular position of the rotation of each of left drive wheel 206A and right drive wheel 206B.

Using all or at least some of the accelerometer, electronic gyroscope, proximity sensors and encoders, control unit 220 can navigate the ARC on the surface of the solar tracker table in any required pattern. In particular, according to the disclosed technique, ARC 204 can use an accelerometer and an electronic gyroscope for maneuvering and navigating over the surface of a solar tracker table. As described below, the electronic gyroscope may be calibrated using the azimuth and the local north of the solar tracker table before the start of a cleaning cycle. The electronic gyroscope of ARC 204 is calibrated by ARC 204 pushing against the protective wall which is positioned on the northern side of the docking station. This direction becomes the local north of the electronic gyroscope, thereby compensating for any inaccuracies in the directional positioning of the solar tracker tables in a north-south direction. Alternatively, the ARC can push against the conductive bars positioned on either the westward side or eastward side for calibrating a local direction of the electronic gyroscope. Using the local north of the solar tracker table as part of the calibration and navigation of the ARC improves the cleaning process of the disclosed technique since the ARC will move over the solar tracker in a north-south (or east-west) direction based on the actual position of the solar tracker. This is unlike the prior art, where a solar tracker may be positioned north-south using magnetic north as the direction of positioning whereas the prior art robotic cleaner cleaning the surface uses true north to determine its location on the solar panel surface. It is noted as well that the at least 6-axis motion sensor can be substituted for a 9-axis motion sensor which includes a magnetometer as well. It is further noted that advances in global positioning system (herein abbreviated GPS) navigation systems may yield GPS sensors having a resolution of better than 1 degree. When such GPS navigation systems become available, a GPS sensor may be included in the ARC of the disclosed technique, and GPS navigation may be used as an aid to the at least 6-axis motion sensor of the ARC, for example for double checking and/or providing a validation check for the position of the ARC on the solar tracker table surface.

One cleaning pattern of the ARC may be that the ARC is moved from docking station 202 to the south edge of the southern section of the solar tracker table without operating the cleaning cylinder. The ARC is then turned westwards and starts to clean the solar tracker table surface in a zigzag pattern from west to east to west until the entire surface has been cleaned. In this pattern, the cleaning is effected from the end to the south end of the solar tracker table. A similar pattern can be effected with the ARC going north to south to north. When the ARC reaches bridge 158 (FIG. 3), the ARC will cross the bridge while also cleaning solar panel 162 (FIG. 3) which is used to recharge the rechargeable power source of the ARC. The ARC will continue its zigzag cleaning pattern towards the north. When the ARC reaches the northern edge of the second section of the solar tracker table, the ARC will then autonomously return to docking station 202. The ARC enters docking station 202 and will park facing east while recharge connectors 232 press eastwards on conductive bars 242. In one embodiment, either one of docking stations 202 or 300 (FIG. 6) may have anchoring elements on both its eastern and western side, such that in this embodiment, at the next high noon, the ARC can turn around facing westwards and move until its recharge connectors press against western placed conductive bars (not shown). As mentioned above, the described pattern of cleaning and recharging is merely an example and other cleaning patterns and recharge procedures are possible.

When a start cleaning command is received by the ARC, control unit 220 checks the tilt position of the solar tracker table using accelerometer 224. If the tilt position is horizontal (or close enough to horizontal, meaning within ±10 degrees from the horizontal), then the ARC will turn to the north and press its recharge connectors toward physical barrier 244 in order to calibrate electronic gyroscope 222. The ARC thus calibrates electronic gyroscope 222 such that its north is the local north of the solar tracker table. Electronic gyroscope 222 calibrates itself using the azimuth of the solar tracker table as represented by the azimuth of physical barrier 244 and a determination of the local north before commencing its cleaning process. After calibration is completed, the ARC can turn south to start the cleaning process as described above.

As part of the disclosed technique, the solar tracker park may include a weather center (not shown) including instruments and sensors such as at least one of a wind vane and an anemometer (both not shown) for determining wind direction and wind speed, as well as other instruments such as a thermometer, a hygrometer and the like, for determining various parameters of the weather present at the solar tracker park. In cases of weather conditions such as a strong westerly wind, cleaning by the ARC may be performed using a cleaning pattern that moves dust and debris from west to east, thereby using the tailwind to enhance the act of cleaning. In this pattern, movements of the ARC from east to west will be idle, without operating the cleaning cylinder. In the case of a strong easterly wind, the cleaning pattern is reversed. Thus the weather center can transmit data to the control unit of the ARC to clean the solar tracker tables using specific cleaning patterns depending on the determined weather present at the solar tracker park.

It is noted that the disclosed technique has been described in the context of a solar tracker table which can tilt from east to west during the course of a day. However the disclosed technique can also be used on fixed angle solar tables provided their angle of tilt is not greater than 10° in either an eastwardly or westwardly direction. In such an embodiment, the ARC of the disclosed technique as well as the docking station is embodied in a similar way as described above however since the solar tables and panels cannot tilt, then a cleaning cycle command is simply provided to the ARC once the sun has set, without requiring a command to be provided to the solar tables and panels to tilt to a horizontal tilt angle of substantially 0°.

Figure 9:
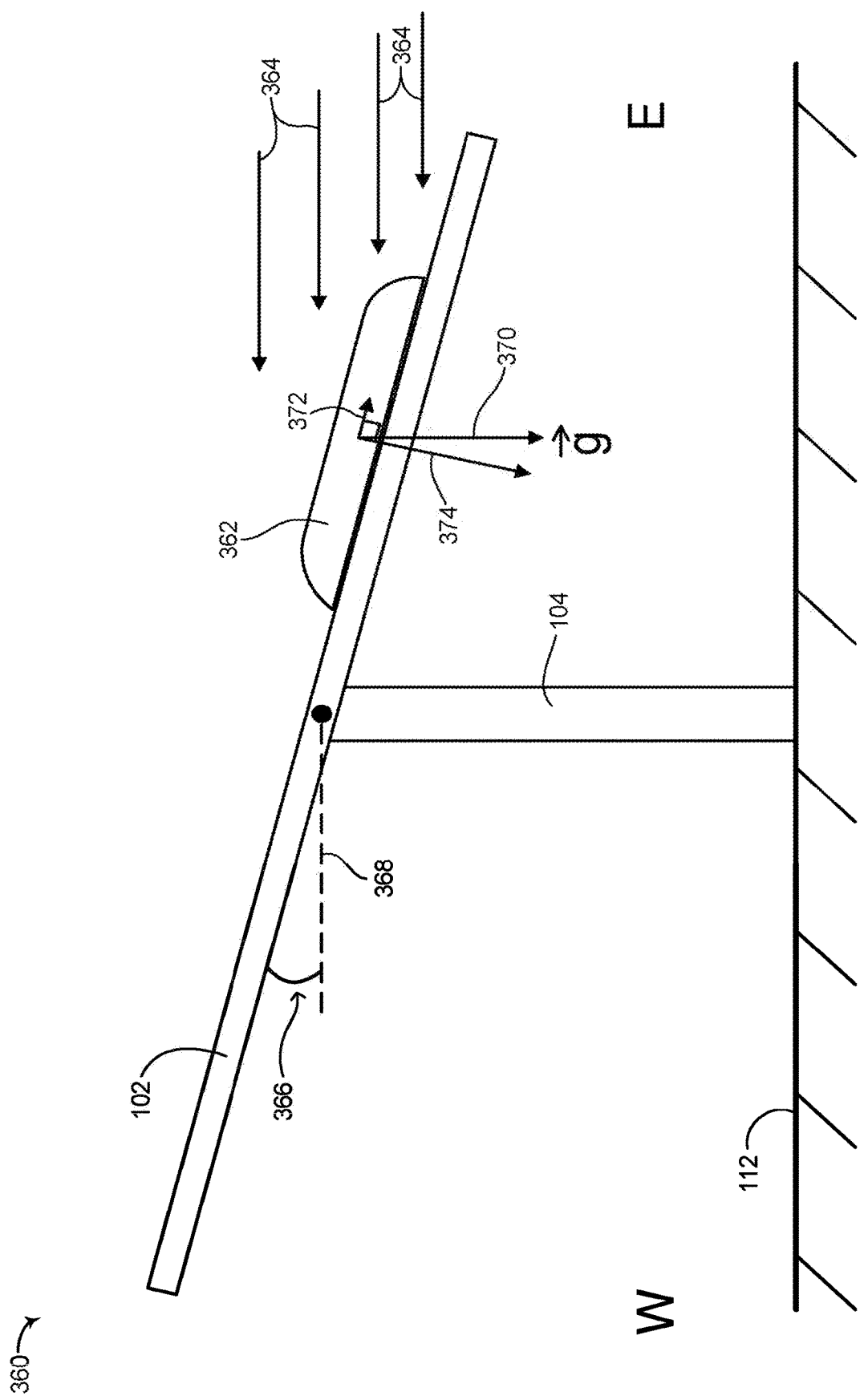
FIG. 9 is a side view of a solar tracker, positioned to enable cleaning by a robotic cleaner under strong wind conditions, constructed and operative in accordance with a further embodiment of the disclosed technique.

Reference is now made to FIG. 9, which is a side view of a solar tracker, positioned to enable cleaning by a robotic cleaner under strong wind conditions, generally referenced 360, constructed and operative in accordance with a further embodiment of the disclosed technique. Similar elements between FIGS. 1 and 2 and FIG. 9 are labeled using identical reference numbers, such as solar tracker 102, supporting pole 104 and ground level 112. FIG. 9 also shows an ARC 362 which is shown schematically as having a cover (not labeled) and thus the inner parts of ARC 362 are not visible. As mentioned above, the ARC of the disclosed technique can clean a solar tracker table angled anywhere between −10° to +10° as measured from a horizontal tilt angle of substantially 0°. In one embodiment of the disclosed technique, ARC 362 cleans the surface of a solar tracker table when it is placed at a horizontal tilt angle of substantially 0°. Also as mentioned above, the ARC of the disclosed technique is lightweight to prevent the weight of the ARC from damaging the surface of the solar tracker tables, especially any anti-reflective coating which may be placed on the surface of the solar trackers. Due to the relative lightweight of the ARC (about 10 kilograms) and its general shape, a sufficiently strong wind may create enough lift force to lift ARC 362 off the surface of solar tracker 102. Thus, certain wind conditions can cause ARC 362 to flip over or to fall off the surface of solar tracker 102.

As shown in FIG. 9, a wind is blowing across the surface of solar tracker 102, shown by a plurality of arrows 364. Based on the Beaufort Scale for windstorms, supposing that wind 364 has a mean wind speed of 29 kilometers per hour (herein abbreviated Km/h), wind 364 will exert a wind pressure of about 4.0 kilograms per square meter (herein abbreviated $Kg/m^2$) over the surface of solar tracker 102. Supposing that ARC 362 has an average surface area of 0.4 $m^2$, the acting wind pressure on ARC 362 due to wind 364 will be 1.6 $Kg/m^2$. The wind pressure exerted on ARC 362 can be compensated for by tilting solar tracker 102 by an angle 366 from a horizontal line 368 as measured from the pivot (not labeled) which controls the angle of solar tracker 102. A gravity vector 370 shows the downward force exerted by gravity on ARC 362 whereas a normal force vector 374 shows the normal force exerted by solar tracker 102 on ARC 362. The component of gravity vector 370 which is parallel to the surface of solar tracker 102, shown as surface vector 372, can be determined by the following formula:

$$\text{SurfaceVector} = M \cdot g \cdot \sin \alpha \qquad (1)$$

where SurfaceVector is the force of surface vector 372 in Newtons, M is the mass of ARC 362 in kilograms and α is angle 366. Given the example above, if angle 366 is about 9° then surface vector 372 should exert enough force to compensate for the wind pressure exerted by wind 364. As mentioned above, since ARC 362 can clean the surface of solar tracker 102 up to a tilt angle of around 10°, wind pressures of up to approximately 1.7 $Kg/m^2$ can be exerted on ARC 362 which can be compensated for by the tilt angle of solar tracker 102. Such a wind pressure on ARC 362 is equivalent to a mean wind speed of approximately 30 Km/h according to the Beaufort Scale (the lower end of what is descriptively referred to as a "fresh breeze" in the Beaufort Scale). Therefore, according to the disclosed technique, ARC 362 can be used to clean the surface of solar tracker 102 up to measured wind speeds of approximately 30 Km/h. At wind speeds higher than that, ARC 362 should remain in its docking station until wind speeds lessen to below 30 Km/h.

According to the disclosed technique, the master controller (not shown) which controls the tilt angle of solar tracker 102, can determine the wind pressure exerted on ARC 362 before ARC 362 leaves its docking station based on weather information. The weather information can be provided by a network connection to a weather service as well as from weather instruments (not shown) coupled with the master controller, for locally determining the weather in the solar tracker park. The weather instruments may include at least one of an anemometer, a hygrometer, a barometer, a thermometer and the like for measuring and determining various characteristics of the local weather. If the master controller determines that a wind is present over the surface of solar tracker 102, and that the average wind speed is less than the upper limit of approximately 30 Km/h, then master controller can determine what title angle solar tracker 102 should be positioned at, based on Equation 1 above, such that the tilt angle compensates for the wind force. It is noted that Equation 1 is useful for winds which generally blow in a direction in line with angle 366. As shown in FIG. 9, wind 364 blows from east (E) to west (W), thus angle 366 can be used to compensate for wind pressure by a predominantly easterly or westerly wind. If the wind in FIG. 9 was blowing predominantly in a northerly or southerly direction (not shown) then the tilt of solar tracker 102 from east to west will not compensate for such wind pressures. In such a scenario, the master controller may set a lower average wind speed limit for giving a command to ARC 362 to leave its docking station and clean the surface of solar tracker 102. It is also noted that each solar tracker table in a solar tracker park may be equipped with weather instruments and that the master controller can determine a different tilt angle per solar tracker table depending on the measured average wind speed over each solar tracker table.

Figure 10:
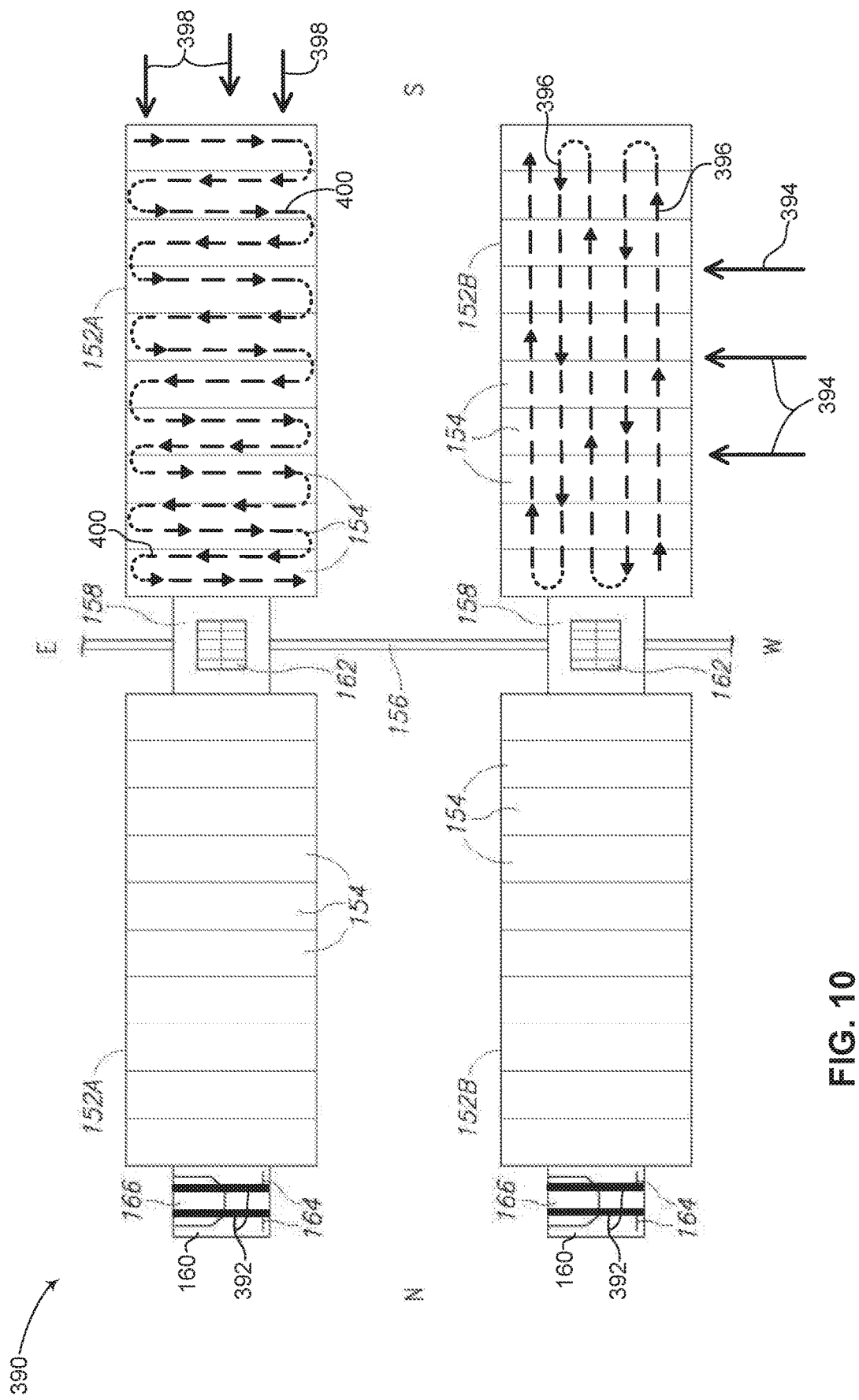
FIG. 10 is a top view of a solar tracker, showing a docking station as well as cleaning patterns for use in varying wind conditions, constructed and operative in accordance with another embodiment of the disclosed technique.

Reference is now made to FIG. 10, which is a top view of a solar tracker, showing a docking station as well as cleaning patterns for use in varying wind conditions, generally referenced 390, constructed and operative in accordance with another embodiment of the disclosed technique. Similar elements between FIG. 3 and FIG. 10 are labeled using identical reference numbers, such as solar tracker table 152A, bridge 158, docking station 160, solar panel 162, anchoring elements 164 and ARC 166. The left side of FIG. 10 shows that docking station 160 now includes locking bars 392. Locking bars 392 are shown as two bars which stretch over the length of docking station 160 and are shown in greater detail below in FIGS. 11 and 12. Locking bars 392 substantially create a cage for ARC 166, forming an upper canopy or roof under which ARC 166 can park and couple with anchoring elements 164. As shown in FIG. 10, if strong or even extreme easterly or westerly winds blow over solar trackers 152A and 152B, with sufficient force to lift ARC 166 off the solar tracker surface, then when ARC 166 is parked in docking station 160, the top side of the cover (not shown) of ARC 166 will come into contact with locking bars 392, which will prevent ARC 166 from flying off of docking station 160. Thus according to the disclosed technique, locking bars 392 enable ARC 166 to remain in docking station 160 even under extreme wind conditions (with extreme being up to and including hurricane conditions). Locking bars can be made from any tough and durable material, such as metal, hard plastic, fiberglass and the like.

The right side of FIG. 10 shows two different cleaning patterns as examples, according to the disclosed technique, of cleaning patterns which can be used to increase the cleaning efficiency of ARC 166 under varying wind conditions. As mentioned above, the master controller (not shown) of solar tracker tables 152A and 152B may be coupled with a weather service or may include weather information equipment and instruments for determining the weather at the site of the solar tracker park. If a wind is detected, the master controller may instruct ARC 166 to clean in a particular pattern such that the direction of the wind is used to aid the cleaning of the surface of the solar tracker. In one example as shown, if a predominantly westerly wind, as shown by a plurality of arrows 394, is determined by the master controller, then ARC 166 may use a sweeping pattern 396 wherein ARC 166 travels in a direction perpendicular to the direction of the detected wind, advancing at each turn in a perpendicular direction in the direction of wind 394. ARC 166 thus travels from north to south and south to north over solar tracker table 152B blowing dirt and debris off the solar tracker surface, and at each turn, ARC 166 advances eastward, in the direction of westerly wind 394. In this manner, ARC 166 moves dirt, debris and dust off solar tracker table 152B in the direction of wind 394. ARC 166 thus moves dirt, debris and dust forward onto as yet uncleaned areas of the solar tracker table surface, in the same general direction which wind 394 is blowing dirt, debris and dust over solar tracker table 152B. The force of wind 394 can therefore be used along with the directional air stream (not shown) of ARC 166 to increase the cleaning efficiency of ARC 166. As another example, if a predominantly southerly wind, as shown by a plurality of arrows 398, is determined by the master controller, then ARC 166 may use a sweeping pattern 400 wherein ARC 166 travels in a direction perpendicular to the direction of the detected wind, advancing at each turn in a perpendicular direction in the direction of wind 398. ARC 166 thus travels from east to west and west to east over solar tracker table 152A blowing dirt and debris off the solar tracker surface, and at each turn, ARC 166 advances northward, in the direction of southerly wind 398. Similar cleaning patterns are possible according to the disclosed technique for northerly and easterly winds (both not shown). According to the disclosed technique, before a command is given to ARC 166 to clean the surface of solar tracker tables 152A and 152B, the master controller determines if a strong enough wind is present, blowing predominantly in one of the cardinal directions. If so, master controller can give ARC 166 a specific command to clean in a sweeping pattern as shown in FIG. 10, wherein the direction of the determined wind is used to increase the efficiency of the cleaning of dirt and debris off the surface of the solar tracker tables by ARC 166. According to another embodiment of the disclosed technique, ARC 166 can be given a command to clean a solar tracker table surface using a sweeping pattern regardless of the direction of the determined wind. In this embodiment, ARC 166 can clean by pushing dirt and debris off the solar tracker table surface following a sweeping pattern wherein ARC 166 travels over the solar tracker surface in a direction perpendicular to the direction of the determined wind and at each turn, advancing in the direction of the wind. Thus the sweeping patterns shown in FIG. 10 can be embodied for any wind direction and are not limited to winds only blowing predominantly in the four cardinal directions.

Figure 11:
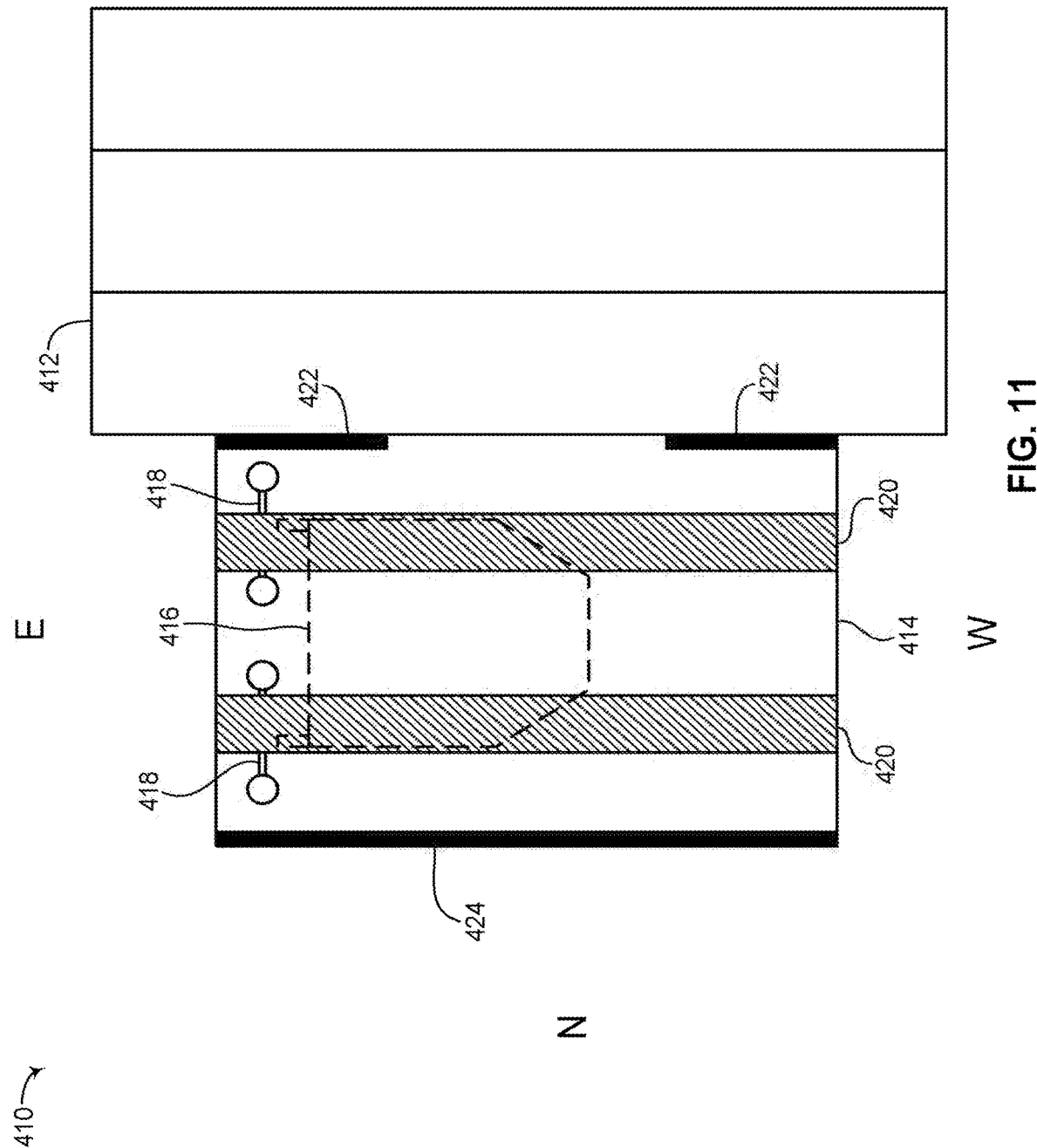
FIG. 11 is a magnified top view of the docking station of FIG. 10, constructed and operative in accordance with a further embodiment of the disclosed technique.

Reference is now made to FIG. 11, which is a magnified top view of the docking station of FIG. 10, generally referenced 410, constructed and operative in accordance with a further embodiment of the disclosed technique. Shown in FIG. 11 is a portion 412 of a solar tracker table, a docking station 414, substantially similar to docking station 160 (FIGS. 3 and 10), an ARC 416 and a plurality of anchoring and charging elements 418. ARC 416 is shown in outline as a dotted line to delineate its position in docking station 414. Docking station 414 includes locking bars 420, an end wall 424 and at least two entrance walls 422. End wall 424 and entrance walls 422 are the height of ARC 416, with end wall stretching the length of docking station 414 and entrance walls 422 being spaced apart enough for ARC 416 to enter and exit. End wall 424 and entrance walls 422 act as physical barriers to prevent ARC 416 from flying off of docking station 414. Entrance walls 422 can also be embodied as a single entrance wall (not shown), longer in length than either one of entrance walls 422 as shown in FIG. 11 and serving the same function as a physical barrier to prevent ARC 416 from flying off of docking station 414. Locking bars 420, as shown, extend the length of docking station 414 and are permanently attached to docking station 414, forming a partial canopy or roof protection under which ARC 416 couples with plurality of anchoring and charging elements 418 when ARC 416 returns to docking station 414 to recharge and/or during inclement weather. Locking bars 420, end wall 424 and entrance walls 422 together form a protective barrier for protecting ARC 416 from lifting off of docking station 414 during extreme wind conditions, thus protecting ARC 416 even during hurricane level winds. As explained above, locking bars 420 are spaced over docking station 414 such that if a strong enough wind, either from an easterly or westerly direction, exerts a lift force on ARC 416, the top of ARC 416 will be stopped by locking bars 420, which prevent ARC 416 from flying off of docking station 414. If a strong southerly wind pushes against ARC 416 in the direction of north, with enough strength to move ARC 416 such that its wheels are pushed in a perpendicular direction, then end wall 424, being at the height of ARC 416, will prevent ARC 416 from falling off the northern side of docking station 414. Likewise, if a strong northerly wind pushes against ARC 416 in the direction of south, with enough strength to move ARC 416 such that its wheels are pushed in a perpendicular direction, then entrance walls 422, being at the height of ARC 416, will prevent ARC 416 from moving sideways off of docking station 414 and possibly off of solar tracker table 412.

Figure 12:
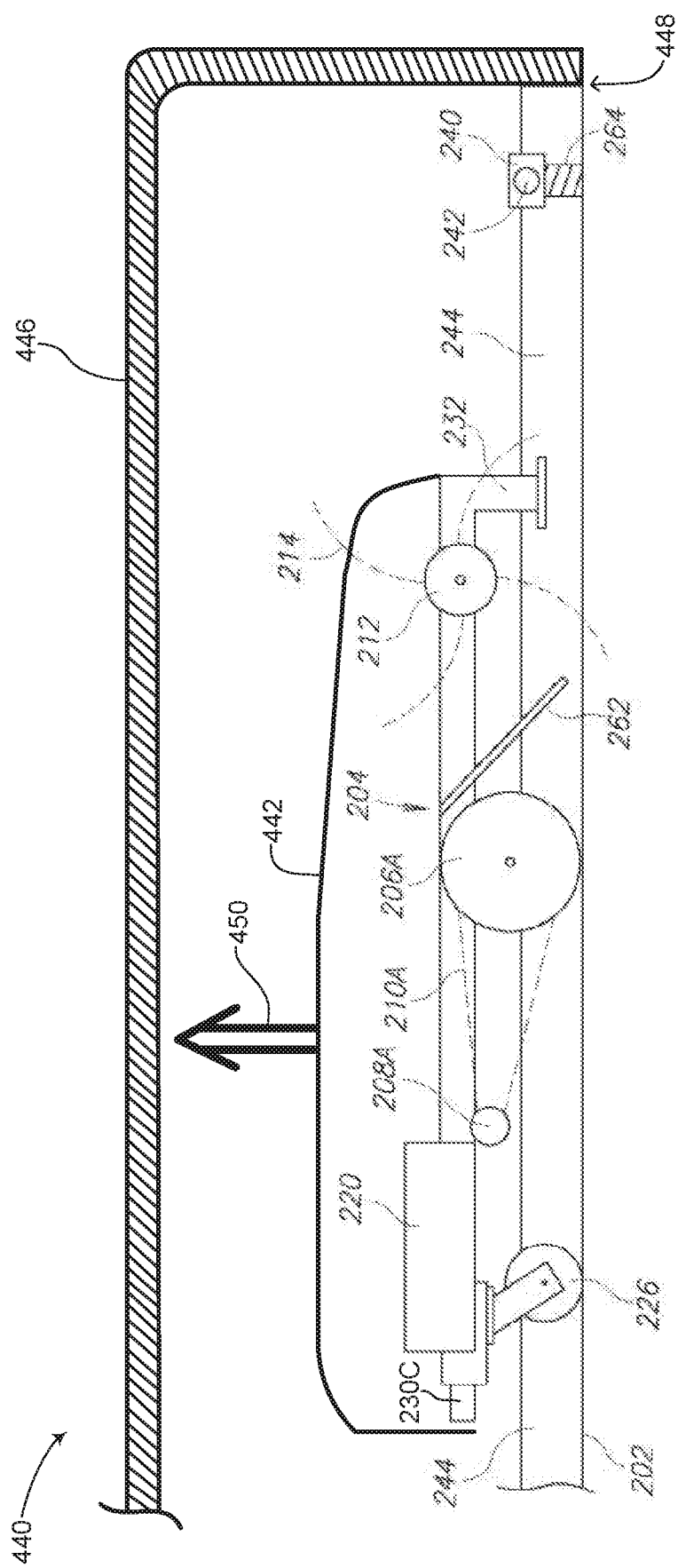
FIG. 12 is a side view of the docking station of FIG. 10, constructed and operative in accordance with another embodiment of the disclosed technique.

Reference is now made to FIG. 12, which is a side view of the docking station of FIG. 10, generally referenced 440, constructed and operative in accordance with another embodiment of the disclosed technique. Similar elements between FIG. 5 and FIG. 12 are labeled using identical reference numbers, such as solar tracker table 202, cleaning cylinder 212 and plurality of microfiber fins 214. Shown in FIG. 12 is a cover 442, covering the inner components of ARC 204 as well as a locking bar 446. As shown, one end of locking bar 446 is coupled with an end of docking station 202, as shown by an arrow 448. Locking bar 446 is permanently fixed to docking station 202 and thus acts as a type of cage for preventing ARC 204 from lifting off docking station 202 under sufficient wind conditions. As shown by an arrow 450, sufficient wind conditions can cause ARC 204 to lift in the direction of arrow 450. However if that begins to happen, the presence of locking bar 446 prevents ARC 204 from fully lifting off of docking station 202.

As mentioned above, the disclosed technique also provides for a method and system for improved weather information sharing during operation and cleaning of a solar tracker park and for improving predicted maintenance and machine learning of maintenance of the solar tracker park. According to the disclosed technique, a solar tracker park or farm may include a master controller for each solar tracker table as well as a master controller for the entire solar tracker park. Each master controller may be coupled with every other master controller and/or with the master controller of the entire solar tracker park such that information can be exchanged between these components. The information can include weather information as well as information about the current status of each solar tracker table. As explained above, the exchange of weather information between the various master controllers is used for optimal and safe operation of the ARCs in the solar tracker farm. It is noted that this exchange of information can be expanded to other aspects of the operation of a solar tracker park, such as the tilt accuracy of each solar tracker table, any breakage in the solar panels of a solar tracker table, cracks and microcracks on the solar panel surface of a solar tracker table, and the like.

This exchange of information can be entered as part of a predictive maintenance algorithm for determining when different types of maintenance should be performed on the solar trackers of the solar tracker park. This exchange of information can also be used for solar tracker park maintenance and management. According to one embodiment of the disclosed technique, each solar tracker table may include at least one weather related instrument, such as an anemometer, thermometer, hygrometer, barometer and the like, such that the specific weather conditions of a given solar tracker table can be determined. Such weather information can be used to give individuals ARCs different cleaning instructions as well as angling individual solar trackers at different cleaning angles depending on the wind conditions determined at different parts of the solar tracker farm. For example, if a strong easterly wind is present, it may be that solar trackers on the eastern side of the solar tracker park will be given instructions to have their ARCs stay under the shelter of the locking bars of the docking stations whereas ARCs on the western side of the solar tracker park, where there may be less wind, will be given instructions to clean their respective solar tracker tables with the solar tracker tables positioned at a specific cleaning angle. In addition, in such a scenario, on the western side of the solar tracker park, different solar trackers may be positioned at different cleaning angles depending on the measured wind force on each solar tracker table.

It will be appreciated by persons skilled in the art that the disclosed technique is not limited to what has been particularly shown and described hereinabove. Rather the scope of the disclosed technique is defined only by the claims, which follow.

The invention claimed is:

1. A solar tracker waterless cleaning system for cleaning solar panels of a solar tracker, said solar tracker being able to be positioned at a pre-determined angle, said solar tracker waterless cleaning system comprising:

a docking station, coupled with an edge of said solar tracker; and an autonomous robotic cleaner (ARC), said ARC comprising:

at least one rechargeable power source;

at least one cleaning cylinder, for cleaning dirt off of a surface of said solar tracker without water;

at least one edge sensor; and a controller, for controlling a cleaning process of said ARC and for transmitting and receiving signals to and from said ARC, said at least one cleaning cylinder further comprising a plurality of fins which rotates for generating a directional air flow for pushing said dirt off of said surface of said solar tracker;

said docking station comprising at least one electrical connector for recharging said at least one rechargeable power source, wherein said ARC can anchor in said docking station;

wherein said ARC cleans said solar tracker when said solar tracker is positioned at said pre-determined angle;

wherein said pre-determined angle is determined from a horizontal angle of zero degrees;

wherein said plurality of fins touches said surface of said solar tracker when said plurality of fins rotates and exerts a pressure of less than 0.1 g/cm² on said surface of said solar tracker;

wherein said ARC pushes said dirt off of said surface of said solar tracker using a pre-defined path; and wherein said ARC cleans said solar tracker by said directional air flow and said touch of said plurality of fins pushing said dirt off of said surface of said solar tracker.

2. The solar tracker waterless cleaning system according to claim 1, said solar tracker comprising:
a first section of solar panels;
a second section of solar panels;
a bridge, for coupling said first section to said second section; and
a recharging section of solar panels.

3. The solar tracker waterless cleaning system according to claim 2, said docking station further comprising a conductive wire, for coupling said at least one electrical connector with said recharging section of solar panels, wherein electricity generated by said recharging section of solar panels is used for recharging said at least one rechargeable power source.

4. The solar tracker waterless cleaning system according to claim 1, further comprising a motion sensor, for determining an angle of said solar tracker and a heading of said ARC.

5. The solar tracker waterless cleaning system according to claim 4, wherein said motion sensor comprises at least one sensor selected from the list consisting of:
an accelerometer;
an electronic gyroscope; and
a magnetometer.

6. The solar tracker waterless cleaning system according to claim 1, said ARC further comprising:
at least two drive wheels;
at least two respective direct current (DC) drive motors, for respectively driving each of said at least two drive wheels;
at least two respective drive belts, for coupling each of said at least two drive wheels to said at least two respective DC drive motors;
a support structure, for supporting a rear section of said ARC; and
at least two recharge connectors, coupled with said at least one rechargeable power source, for electrically coupling said at least one rechargeable power source with said at least one electrical connector of said docking station,
wherein each one of said at least two drive wheels comprises at least one respective encoder.

7. The solar tracker waterless cleaning system according to claim 1, wherein said at least one edge sensor is for at least one of:
determining an edge of said solar tracker;
enabling said ARC to move accurately along at least one edge of said solar tracker; and
preventing said ARC from exceeding said at least one edge of said solar tracker.

8. The solar tracker waterless cleaning system according to claim 1, said ARC further comprising:
at least one cleaning cylinder direct current (DC) drive motor, for driving said at least one cleaning cylinder;
a cleaning cylinder drive belt, for coupling said at least one cleaning cylinder DC drive motor with said at least one cleaning cylinder; and
an angular flat element,
wherein said angular flat element directs said directional air flow generated by said plurality of fins forward.

9. The solar tracker waterless cleaning system according to claim 1, wherein said plurality of fins is fabricated from a material selected from the list consisting of:
microfiber;
fabric;
textile; and
cloth materials.

10. The solar tracker waterless cleaning system according to claim 1, said controller further comprising:
a processor; and
a transmitter-receiver.

11. The solar tracker waterless cleaning system according to claim 1, wherein said at least one edge sensor is selected from the list consisting of:
a proximity sensor;
an ultrasonic proximity sensor;
an IR sensor; and
a capacitance sensor.

12. The solar tracker waterless cleaning system according to claim 1, wherein said ARC is capable of at least one of:
omni-directional travel; and
uni-directional travel.

13. The solar tracker waterless cleaning system according to claim 1, wherein said pre-defined path is selected from the list consisting of:
a zigzag path;
a scanning path; and
a sweeping path.

14. The solar tracker waterless cleaning system according to claim 1, wherein said directional air flow minimizes a pressure exerted on an anti-reflective coating covering said solar panels.

15. The solar tracker waterless cleaning system according to claim 1, wherein in said docking station, said at least one rechargeable power source remains coupled with said at least one electrical connector while said solar tracker changes angles.

16. Method for waterlessly cleaning a solar tracker comprising at least one autonomous robotic cleaner (ARC) which cleans without water, said ARC comprising at least one edge sensor, said solar tracker being able to be positioned at a pre-determined angle, comprising the procedures of:
positioning said solar tracker at said pre-determined angle during nighttime hours, wherein said pre-determined angle is determined from a horizontal angle of zero degrees;

providing a start clean signal to said ARC to clean a surface of said solar tracker; and cleaning said solar tracker by using a directional air flow to push dirt off of said surface of said solar tracker using a pre-defined path.

17. The method for waterlessly cleaning according to claim 16, said solar tracker further comprising a docking station with a plurality of anchoring elements, further comprising the procedure of providing a return to docking station signal to said ARC when inclement weather is detected.

18. The method for waterlessly cleaning according to claim 16, wherein said pre-defined path is selected from the list consisting of:
   a zigzag path;
   a scanning path; and
   a sweeping path.

19. The method for waterlessly cleaning according to claim 16, wherein said procedure of cleaning said solar tracker using said directional air flow minimizes a pressure exerted on an anti-reflective coating covering solar panels of said solar tracker.

20. A fixed angle solar table waterless cleaning system for cleaning solar panels of a solar table, said solar table being fixed at a pre-determined angle, said solar table waterless cleaning system comprising:
   a docking station, coupled with an edge of said solar table; and
   an autonomous robotic cleaner (ARC),
   said ARC comprising:
   at least one rechargeable power source;
   at least one cleaning cylinder, for cleaning dirt off of a surface of said solar table without water;
   at least one edge sensor; and
   a controller, for controlling a cleaning process of said ARC and for transmitting and receiving signals to and from said ARC,
   said at least one cleaning cylinder further comprising a plurality of fins which rotates for generating a directional air flow for pushing said dirt off of said surface of said solar table;
   said docking station comprising at least one electrical connector for recharging said at least one rechargeable power source,
   wherein said ARC can anchor in said docking station;
   wherein said plurality of fins touches said surface of said solar table when said plurality of fins rotates and exerts a pressure of less than 0.1 g/cm$^2$ on said surface of said solar table;
   wherein said ARC pushes said dirt off of said surface of said solar table using a pre-defined path; and
   wherein said ARC cleans said solar table by said directional air flow and said touch of said plurality of fins pushing said dirt off of said surface of said solar table.

21. The fixed angle solar table waterless cleaning system according to claim 20, wherein said ARC is capable of at least one of:
   omni-directional travel; and
   uni-directional travel.

22. The fixed angle solar table waterless cleaning system according to claim 20, wherein said at least one edge sensor is for at least one of:
   determining an edge of said solar table;
   enabling said ARC to move accurately along at least one edge of said solar table; and
   preventing said ARC from exceeding said at least one edge of said solar table.

23. The fixed angle solar table waterless cleaning system according to claim 20, wherein said at least one edge sensor is selected from the list consisting of:
   a proximity sensor;
   an ultrasonic proximity sensor;
   an IR sensor; and
   a capacitance sensor.

24. Method for waterlessly cleaning at least one fixed angle solar table comprising at least one autonomous robotic cleaner (ARC) which cleans without water, said at least one solar table being fixed at a pre-determined angle, comprising the procedures of:
   providing a start clean signal to said ARC to clean a surface of said at least one solar table; and
   cleaning said at least one solar table by using a directional air flow to push dirt off of said surface of said at least one solar table using a pre-defined path,
   wherein said ARC comprises at least one cleaning cylinder comprising a plurality of fins which rotates for generating said directional air flow for pushing said dirt off of said surface of said at least one solar table;
   wherein said ARC also comprises at least one edge sensor; and
   wherein said plurality of fins exerts a pressure of less than 0.1 g/cm$^2$ on said surface of said at least one solar table.

25. A solar tracker waterless cleaning system for cleaning solar panels of a solar tracker, said solar tracker being able to be positioned at a pre-determined angle, said solar tracker waterless cleaning system comprising:
   a docking station, coupled with an edge of said solar tracker; and
   an autonomous robotic cleaner (ARC),
   said ARC comprising:
   at least one rechargeable power source;
   at least one cleaning cylinder, for cleaning dirt off of a surface of said solar tracker without water;
   at least one edge sensor; and
   a controller, for controlling a cleaning process of said ARC and for transmitting and receiving signals to and from said ARC,
   said at least one cleaning cylinder further comprising a plurality of fins which rotates for generating a directional air flow for pushing said dirt off of said surface of said solar tracker;
   said docking station comprising at least one electrical connector for recharging said at least one rechargeable power source,
   wherein said ARC can anchor in said docking station;
   wherein said plurality of fins touches said surface of said solar tracker when said plurality of fins rotates and exerts a pressure of less than 0.1 g/cm$^2$ on said surface of said solar tracker;
   wherein said ARC pushes said dirt off of said surface of said solar tracker using a pre-defined path; and
   wherein said ARC cleans said solar tracker by said directional air flow and said touch of said plurality of fins pushing said dirt off of said surface of said solar tracker.

26. The solar tracker waterless cleaning system according to claim 25, wherein said ARC is capable of at least one of:
   omni-directional travel; and
   uni-directional travel.

27. The solar tracker waterless cleaning system according to claim 25, wherein said at least one edge sensor is for at least one of:
   determining an edge of said solar tracker;

enabling said ARC to move accurately along at least one edge of said solar tracker; and preventing said ARC from exceeding said at least one edge of said solar tracker.

28. Method for waterlessly cleaning a solar tracker comprising at least one autonomous robotic cleaner (ARC) which cleans without water, said solar tracker being able to be positioned at a pre-determined angle, comprising the procedures of:

positioning said solar tracker at said pre-determined angle, wherein said pre-determined angle is determined relative to a horizontal angle of zero degrees;

providing a start clean signal to said ARC to clean a surface of said solar tracker; and cleaning said solar tracker by using a directional air flow to push dirt off of said surface of said solar tracker using a pre-defined path, wherein said ARC comprises at least one cleaning cylinder comprising a plurality of fins which rotates for generating said directional air flow for pushing said dirt off of said surface of said solar tracker;

wherein said ARC also comprises at least one edge sensor; and wherein said plurality of fins exerts a pressure of less than 0.1 g/cm$^2$ on said surface of said solar tracker.

* * * * *